United States Patent [19]

Hashiguchi et al.

[11] Patent Number: 5,444,518
[45] Date of Patent: Aug. 22, 1995

[54] IMAGE FORMING APPARATUS WHICH ADDS IDENTIFICATION INFORMATION TO RECORDED IMAGES TO PREVENT FORGERY

[75] Inventors: Tadato Hashiguchi; Michiyoshi Tachikawa; Takeshi Ukai, all of Yokohama; Yoshio Kaneko, Tokyo; Hiroshi Takahashi, Kawasaki; Takashi Saitoh, Yokohama; Kazuo Murai, Tokyo; Yukio Sakano, Fuchu; Midori Aida, Yokohama; Shinji Yamakawa, Kawasaki; Toshiya Hikita, Machida, all of Japan

[73] Assignee: Ricoh Company, Ltd., Tokyo, Japan

[21] Appl. No.: 211,320

[22] PCT Filed: Aug. 4, 1993

[86] PCT No.: PCT/JP93/01094

§ 371 Date: Apr. 5, 1994

§ 102(e) Date: Apr. 5, 1994

[87] PCT Pub. No.: WO94/03996

PCT Pub. Date: Feb. 17, 1994

[30] Foreign Application Priority Data

| Aug. 5, 1992 | [JP] | Japan | 4-229355 |
| Aug. 15, 1992 | [JP] | Japan | 4-238942 |
| Aug. 16, 1992 | [JP] | Japan | 4-239055 |

[51] Int. Cl.⁶ .......................................... G03G 21/00
[52] U.S. Cl. .................................... 355/201; 358/296; 358/501
[58] Field of Search ............... 355/201, 202, 200; 358/296, 300, 401, 501

[56] References Cited

U.S. PATENT DOCUMENTS

| 3,852,088 | 12/1974 | Godlewski et al. | 355/201 X |
| 4,891,666 | 1/1990 | Gordon | 355/201 X |
| 4,908,873 | 3/1990 | Philibert et al. | 355/201 X |
| 5,216,724 | 6/1993 | Suzuki et al. | 355/201 X |
| 5,291,243 | 3/1994 | Heckman et al. | 355/201 |
| 5,313,256 | 5/1994 | Bov et al. | 355/202 X |
| 5,321,470 | 6/1994 | Hasuo et al. | 355/201 |

Primary Examiner—Fred L. Braun
Attorney, Agent, or Firm—Oblon, Spivak, McClelland, Maier & Neustadt

[57] ABSTRACT

An image forming apparatus including an image reading unit for reading an original and for outputting image data corresponding to the original, an image processing unit for processing the image data supplied from the image reading unit in accordance with a predetermined method and for outputting printing image data, a printer unit for printing an image corresponding to the printing image data supplied from the image processing unit, and an image adding unit for adding an identification information to the recording sheet on which the image is formed by the printer unit, the identification information identifying the image forming apparatus in order to prevent forgery of securities, confidential documents or backnotes. A detector detects the presence or absence of the image adding unit and disables the copying functions when the image adding unit is absent.

9 Claims, 29 Drawing Sheets

MAIN SCANNING →

SUB SCANNING ↓

FIG. 15
(a) 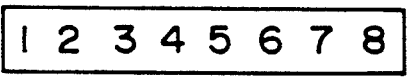 NUMERALS
(b)  BAR CODE
(c)  MOSAIC

BACKGROUND (BILL)

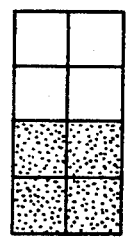
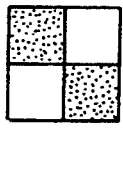
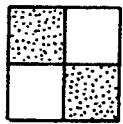
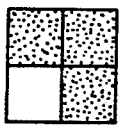
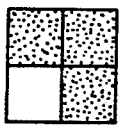
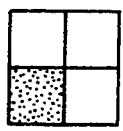
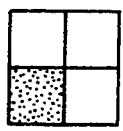
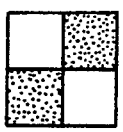
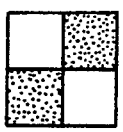
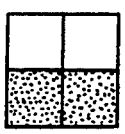
FIG.26A START MARK
FIG.26B 0
FIG.26C 1
FIG.26D 2
FIG.26E 3
FIG.26F 4
FIG.26G END MARK
FIG.26H 5
FIG.26I 6
FIG.26J 7
FIG.26K 8
FIG.26L 9

IMAGE FORMING APPARATUS WHICH ADDS IDENTIFICATION INFORMATION TO RECORDED IMAGES TO PREVENT FORGERY

TECHNICAL FIELD

The present invention relates to an image forming apparatus, such as a digital full-color copy machine, and more particularly to an image forming apparatus having a unit for adding follow-up information indicating an apparatus, from which a formed image is originated, to the formed image.

BACKGROUND ART

It is prohibited by law to forge special original, such as bills and securities. Thus, image processing apparatuses (copy machines) in which special originals, such as bills and securities, cannot be copied has been proposed in, for example, Japanese Laid Open Patent Applications No.60-229572, No.1-316782 and No.1-316783. In these proposed apparatus, it is determined whether or not an original is a special original forgery of which is prohibited by law, an image of the original determined as the special original is converted into another image, and a paper having the converted image is obtained.

In the above apparatuses, such as copy machines, it is determined whether or not an original is the special original forgery prohibited by law. However, it is difficult to precisely determine whether or not an original is the special original. Thus, it takes a long time to determine whether or not an original is the special original. As a result, a speed at which copies of normal originals are obtained is deteriorated. Further, if normal originals are determined as the special originals in error, the copies of the normal original are not obtained at all. On the other hand, there may be an instance where a special original is not determined as such in error.

In addition, if special originals, such as bills and securities, have been copied and these copies, such as forged bills and forged securities, have been diffused, it is difficult to follow up machines which made these copies based on only information obtained from these copies.

Further, in the conventional copy machine having a unit for preventing special originals from being copied, if the unit is removed from the copy machine, it is possible to copy the special originals.

DISCLOSURE OF THE INVENTION

Accordingly, a general object of the present invention is to provide a novel and useful image forming apparatus in which the disadvantages of the aforementioned prior art are eliminated.

A more specific object of the present invention is to provide an image forming apparatus in which even if a special original forgery prohibited by law has been copied, the apparatus by which the special originals have been copied can be followed up.

The above objects of the present invention are achieved by an image forming apparatus comprising: image reading means for reading an original and for outputting image data corresponding to the original; image processing means, coupled to the image reading means, for processing the image data supplied from the image reading means in accordance with a predetermined method and for outputting printing image data; printing means, coupled to the image processing means, for printing an image, corresponding to the printing image data supplied from the image processing means, on a recording sheet; and image adding means, coupled to printing means, for adding an identification information to the recording sheet on which the image is formed by the printing means, the identification information identifying the image forming apparatus.

Another object of the present invention is to prevent the above image forming apparatus from operating to copy the special originals without the follow-up information.

The above objects of the present invention are achieved by the above image forming apparatus further comprising detecting means for detecting whether or not the image adding means has been removed from the image forming apparatus; and control means for prohibiting the image from being formed on the recording sheet when the detecting means detects that the image adding means has been removed from the image forming apparatus.

BRIEF DESCRIPTION OF THE DRAWINGS

FIG. 15 (a), (b) and (c) is a diagram illustrating examples of identification marks.

FIG. 26 (a), (b), (c), (d), (e), (f), (g), (h), (i), (j), (k), and (l) is a diagram illustrating elements of an identification mark.

BEST MODE OF CARRING OUT THE INVENTION

A description will now be given, with reference to FIGS. 1–5, of a first embodiment of the present invention.

Figure 1:
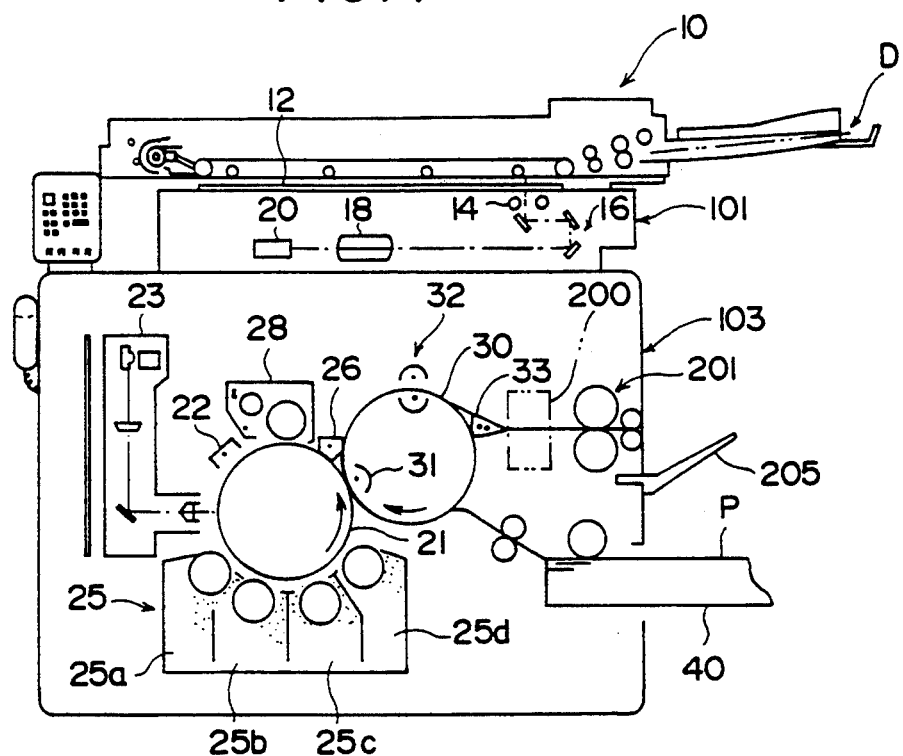
FIG. 1 is a diagram illustrating a copy machine according to an embodiment of the present invention.

A structure of a copy machine is shown in FIG. 1. Referring to FIG. 1, the copy machine has an original feeder unit 10, an image reader unit 101 and a printer unit 103. The original feeder unit 10 is mounted on the image reader unit 101, and originals are automatically supplied on a platen glass 12 and are ejected therefrom after scanning operation of the image reader unit 101. The image reader unit 101 is provided under the platen glass 12 and has a light source 14, a mirror assembly 16, an optical system 18 and a color sensor 20 (e.g. a CCD sensor). The light source 14 is moved under the platen glass 12 in a direction parallel to the surface of the platen glass 12 such that a light emitted from the light source 14 scans an original on the platen glass 12. The reflecting light from the document travels through the mirror assembly 16 and optical system 18 to the color sensor 20. The color sensor 20 outputs signals corresponding to colors: red (R), green (G) and blue (B). The image reader unit 101 generates RGB image data corresponding to an image of the original based on the signals from the color sensor 20.

The printer unit 103 operates in accordance with an electrophotographic process. That is, in the printer unit 103, a charging unit 22, an optical writing unit 23, a developing assembly 25, a transfer drum 30, a transfer unit 31, a discharging unit 26 and a cleaning unit 28 are arranged around a photosensitive drum 21 so that the electrophotographic process is performed. The optical writing unit 23 outputs a light beam (a laser beam) modulated in accordance with color printing image data (for cyan, magenta, yellow and black) into which the RGB image data is converted by an image processing unit will be described later. The light beam is projected on the surface of the photosensitive drum 21 which has been uniformly charged by the charging unit 22, so that an electrostatic latent image is formed on the surface of the photosensitive drum 21. The developing assembly 25 has a first unit 25a having cyan toner, a second unit 25b having magenta toner, a third unit 25c having yellow toner and a fourth unit having black toner. During four revolutions of the photosensitive drum 21, four latent images for cyan, magenta, yellow and black colors are developed by the respective units 25a, 25b, 25c and 25d of the developing assembly 25. A recording paper P supplied from a cassette 40 to the transfer drum 30 is held on the surface of the transfer drum 30. Then, during four revolutions of the transfer drum 30, a cyan toner image, a magenta toner image, a yellow toner image and a black toner image are successively transferred to the recording paper P by the transfer unit 31 so that a full-color image is formed on the recording sheet P. The recording sheet P having the full-color image is separated from the transfer drum 30 by a discharging unit 32 and a separating device 33, and is fed toward an outlet tray 205. The recording sheet P passes through a follow-up information printing unit 200 and a fusing-/fixing unit 201 and is rejected to the outlet tray 205.

Figure 2:
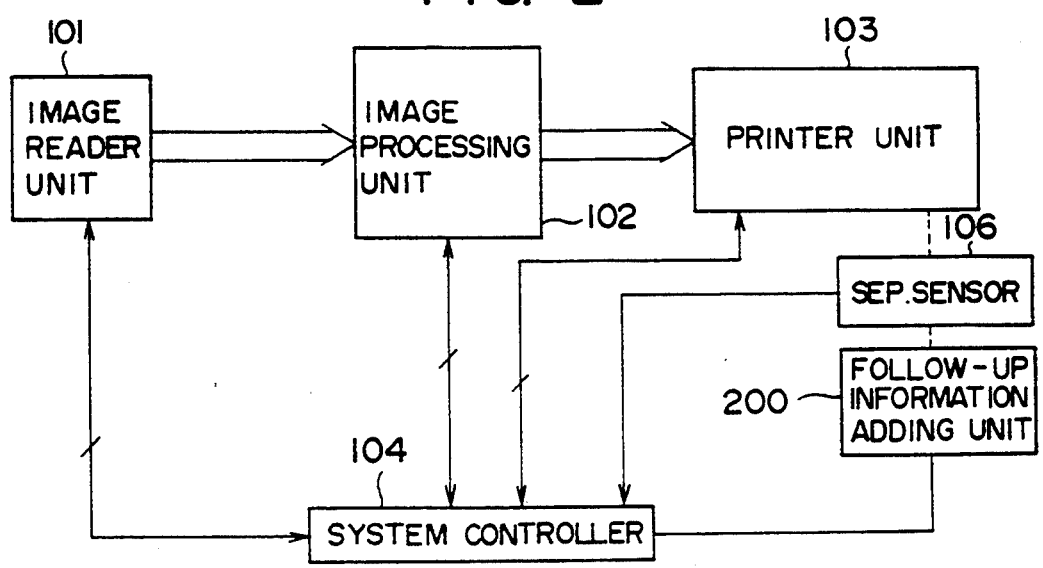
FIG. 2 is a block diagram illustrating a control system in the copy machine shown in FIG. 1.

A control system of the copy machine is formed as shown in FIG. 2. Referring to FIG. 2, the color image sensor 20 in the image reader unit 101 optically scans an original set on the platen glass 12 in a rate of 400 dpi. The image reader unit 101 then outputs RGB image data corresponding to signals supplied from the color image sensor 20. The RGB image data is supplied to the image processing unit 102. The image processing unit 102 applies various image processes to the RGB image data and converts the RGB image data into color printing image data for cyan, magenta, yellow and black. The color printing image data is supplied from the image processing unit 102 to the optical writing unit 23 of the printer unit 103. The image reading unit 101, the image processing unit 102 and the printer unit 103 are controlled by a system controller 104. The follow-up information printing unit 200 is mounted in the printer unit 103 via a separation sensor 106. The separation sensor 106 outputs a detecting signal when the follow-up unit 200 is removed from the printer unit 103.

The follow-up information printing unit 200 is formed as follows.

Figure 3:
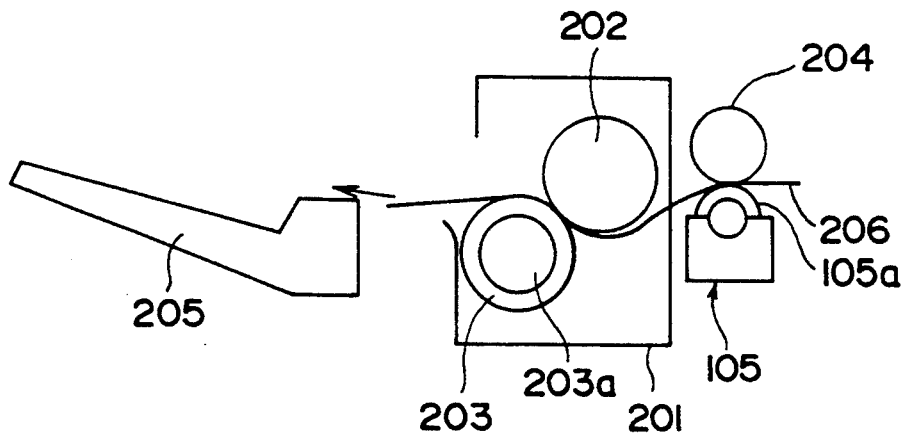
FIG. 3 is a diagram illustrating a mechanism of a follow-up information printing unit shown in FIG. 1.
Figure 4:
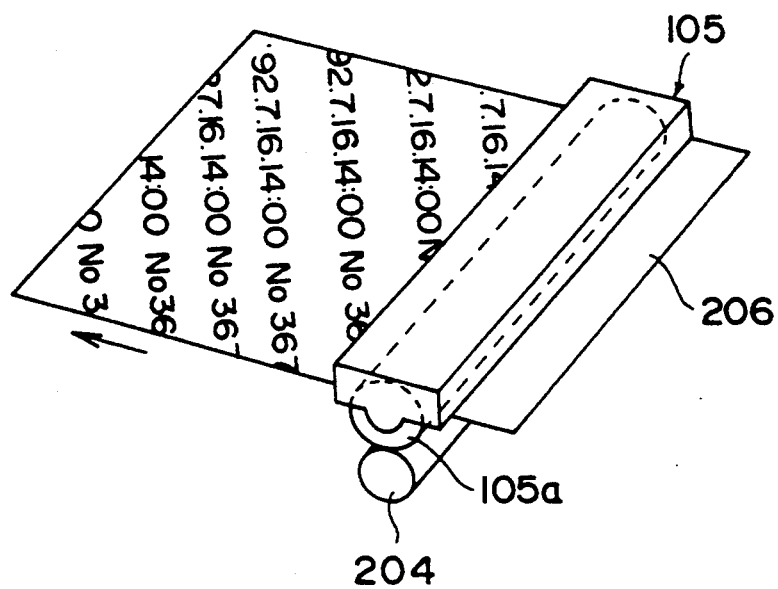
FIG. 4 is a diagram illustrating a recording sheet on which follow-up information has been printed.

Referring to FIG. 3, the follow-up information printing unit 200 is provided at the upstream side of the fusing/fixing unit 201. In the follow-up information unit 200, a printing assembly 105 and a pressing roller 204 are respectively provided on the lower and upper sides of a path through which recording sheets are conveyed such that the pressing roller 204 may press a recording sheet 206 against a transfer roller 105a of the printing assembly 105. The printing assembly 105 has an ink supplier (not show) for supplying special ink to a numbering roller (not shown). The numbering roller has a numbering mechanism capable of setting a plurality of figures. An ink image corresponding to the figures set in the numbering mechanism is transferred from the numbering roller to the transfer roller 105a, and the ink image is further transferred from the transfer roller 105a to the rear surface of the recording sheet 206. Thus information having the figures is printed on the recording sheet 206 as shown in FIG. 4. The information printed on the rear surface of the recording sheet indicates, for example, the data and time at which the color image is formed, and a machine number identifying this copy machine. This information is referred to as follow-up information.

The above special ink used in the follow-up information printing unit 200 has a high transmittance in a visible region and a low transmittance in a region other than the visible region. Thus, although the follow-up information printed using the special ink is usually little visible, the follow-up information can be read using rays, such as ultraviolet rays or infrared rays, other than a visible light. The special ink having the above property is made, for example, from indium-tin (In-Sn) oxide or tin (Sn) oxide.

The recording sheet having a color image formed on the surface thereof and the follow-up information printed on the rear surface thereof is fed to the fusing-/fixing unit 201. While the recording sheet 206 is passing between a pressing roller 202 and a heating roller 203 having a heater 203a, the color image (a toner image) is fixed on the recording sheet 206. In addition, the ink image of the follow-up information is rapidly dried by the fusing/fixing unit 201.

Figure 5:
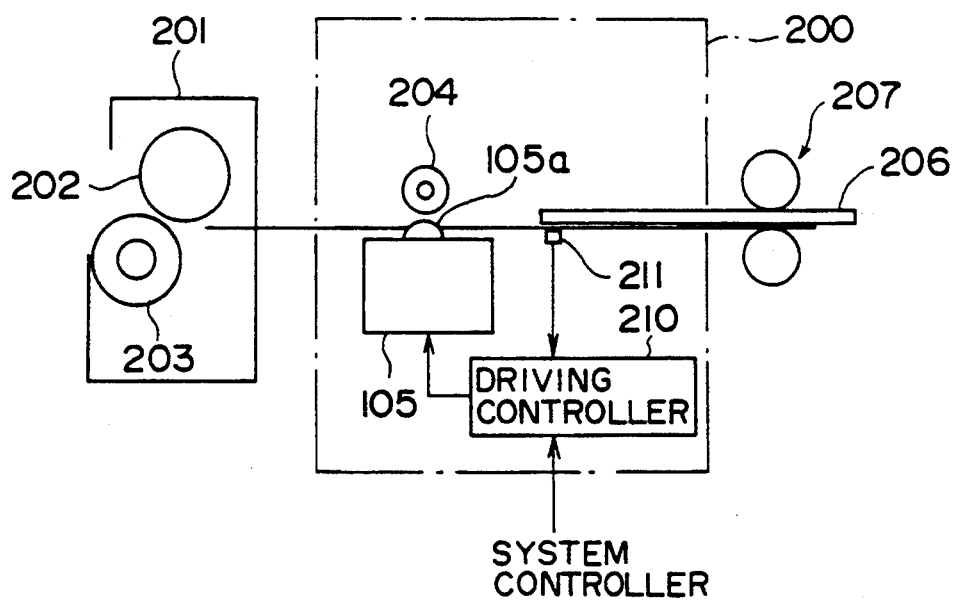
FIG. 5 is a diagram illustrating a control system of the follow-up information printing unit shown in FIG. 2.

The above printing assembly 105 is controlled by a control system as shown in FIG. 5. Referring to FIG. 5, a reflective optical sensor 211 is provided on immediately upstream side of the printing assembly 105. The reflective optical sensor 211 outputs a detecting signal. The detecting signal has a high level when the recording sheet 206 is located over the reflective optical sensor 211. On the other hand, the detecting signal has a low level when there is no recording sheet over the reflective optical sensor 211. The detecting signal output from the reflective optical sensor 211 is supplied to a driving controller 210. The driving controller 210 is activated in accordance with instructions from the system controller 104. When the detecting signal has the high level, the driving controller 210 supplies a driving signal to the printing assembly 105 so that the driving assembly 105 is driven. That is, the numbering roller and the transfer roller 105a are rotated so that the follow-up information having a plurality of figures is printed on the rear surface of the recording sheet 206.

Returning to FIG. 2, the system controller 104 always monitors whether or not the detecting signal is output from the separation sensor 106. When the follow-up information printing unit 200 is removed from the printer unit 103, the separation sensor 106 outputs the detecting signal. In this case, when the system controller 104 receives the detecting signal, the system controller 104 supplies a prohibiting control signal to the image reader unit 101, the image processing unit 102 and the printer unit 103. As a result, the image reader unit 101, the image processing unit 102 and the printer unit 103 become inactive. After this, even if an user operates a start key, the copy machine is not driven.

The separation sensor 106 may also output detecting signal when at least the printing assembly 105 of the follow-up information printing unit 200 is removed from the printer unit 103.

In the above copy machine, a color image is never formed on the recording sheet without the follow-up information printed on the rear surface of the recording sheet. Thus, if bills are forged by this copy machine, the follow-up information is provided on the rear surface of the forged bills. The follow-up information is normally little visible, but the follow-up information can be visualized by using one of the ultraviolet rays and the infrared rays. As a result, the copy machine by which the bills have been forged can be followed up based on the visualized follow-up information (the date and time and the machine number and so on). In addition, if the follow-up information printing unit 200 is removed from the printing unit 103 in order to forge the special original, such as bills and securities, the copy machine becomes inactive. Thus, the forgery of special original is prevented.

In the above embodiment, the follow up information may be formed at least on an area of the rear surface of the recording sheet corresponding to an area on which a color image is formed.

In the above embodiment, when the separation sensor 106 detects that the follow-up information printing unit 200 is removed from the printer unit 103, all the units 101, 102 and 103 are inactive. However, when the follow-up information printing unit 200 is removed from the printer 103, only one of the units 101, 102 and 103 may become inactive.

Figure 6:
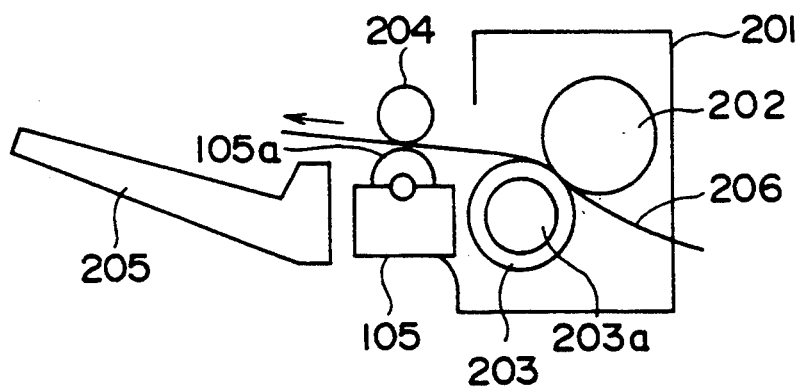
FIG. 6 is a diagram illustrating another arrangement of the mechanism of the follow-up information printing unit.

The printing assembly 105 and the pressing roller 204 may be provided on the downstream side on the fusing-/fixing unit 201 as shown in FIG. 6.

Figure 7:
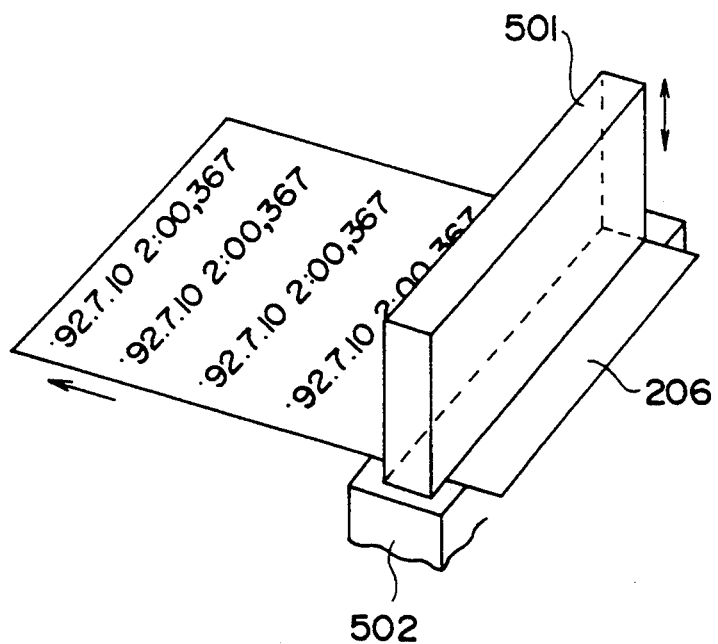
FIG. 7 is a diagram illustrating another mechanism of the follow-up information printing unit.
Figure 8:
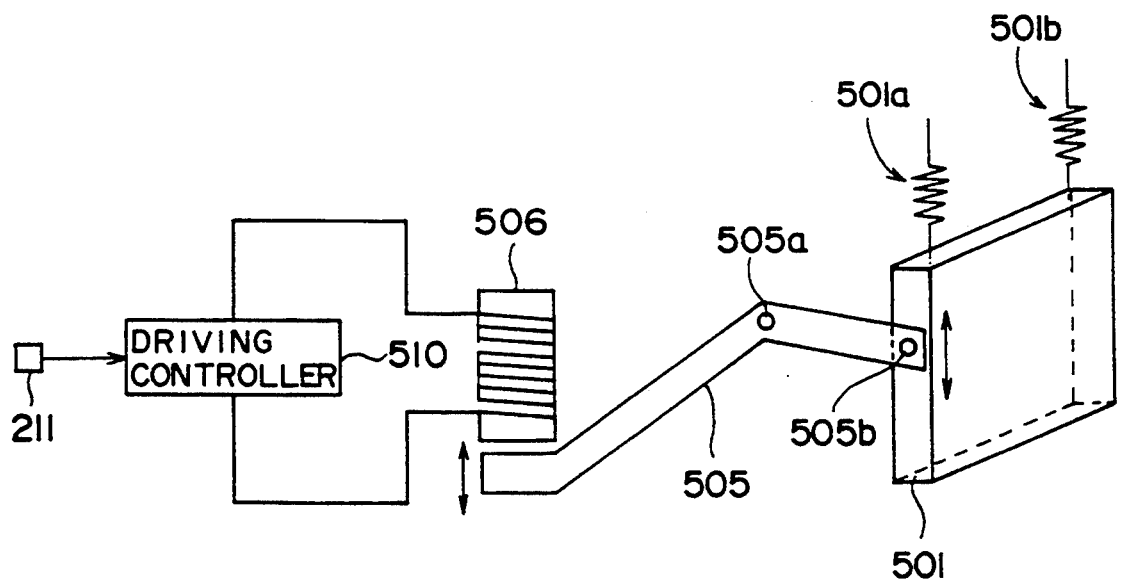
FIG. 8 a is diagram illustrating a driving control system of the mechanism shown in FIG. 7.

The follow-up information printing unit 200 may be also formed as shown in FIG. 7 and FIG. 8.

Referring to FIG. 7, the recording sheet 206 passes through between a stamper 501 having a numbering mechanism and a stamp base 502. The special ink described above is supplied to the numbering mechanism, so that the follow-up information is stamped on the rear surface of the recording sheet 206 by the stamper 501 using the special ink. The stamper 501 are moved up and down by a driving mechanism as shown in FIG. 8. That is, the driving mechanism has springs 501a and 501b supporting the stamper 501, a lever 505 pivotable on a shaft 505a. A first end of the lever 505 is rotatably mounted on the stamper 501, The driving mechanism also has a solenoid 506 couple to a second end of the lever 505. The solenoid 506 is turned on and off by a driving controller 510 coupled to the reflective photo sensor 211. When the detecting signal supplied from the reflective photo sensor 211 has the high level, the driving controller 510 controls the solenoid 506 such that the solenoid 506 is repeatedly turned on and off. In this case, the stamper 501 is moved up and down by the lever 505 moved by the solenoid 506. On the other hand, when the detecting signal from the reflective photo sensor 211 has the low level, the solenoid is turned off. As a result, the stamper 501 is maintained to be separated from the stamp base 502.

A description will now be given, with respect to FIGS. 9, 10, 11, 12, 13, 14A, 14B, and 15, of a second embodiment of the present invention.

Figure 9:
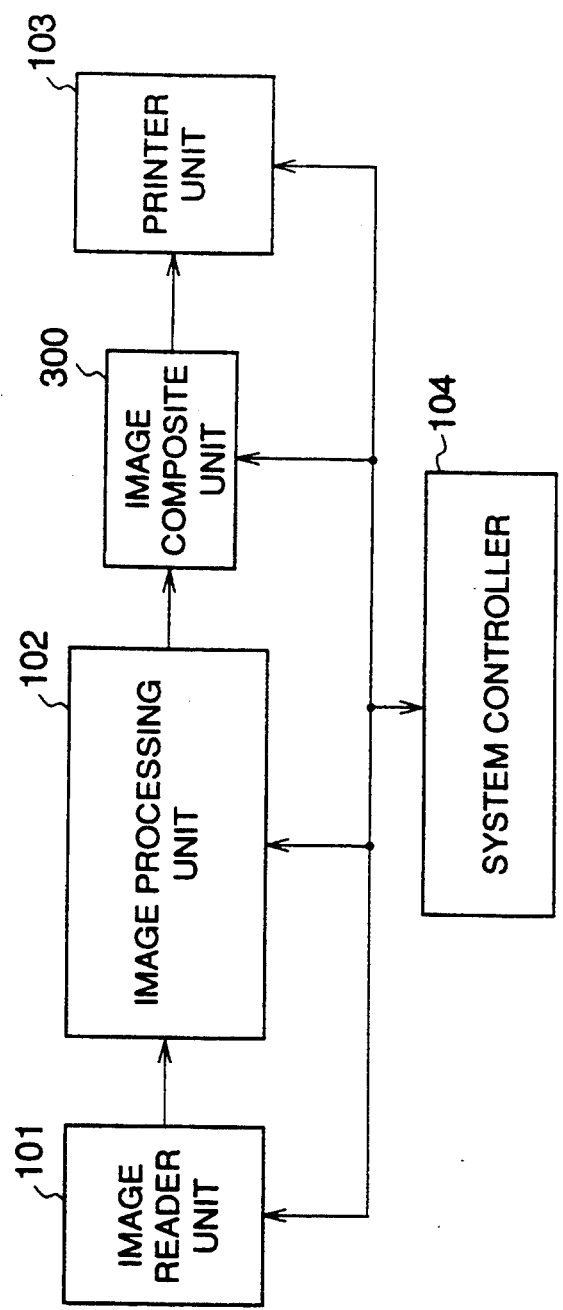
FIG. 9 is a block diagram illustrating a control system of a copy machine in other embodiments.

A copy machine according to the second embodiment of the present invention has the same structure as that shown in FIG. 1. A control system of the copy machine is formed as shown in FIG. 9. Referring to FIG. 9, the control system has the image reader unit 101, the image processing unit 102 for carrying our various processes (e.g. a γ-correction process, a halftone process and the like), the printer unit 103, the system controller unit 104 in the same manner as those shown in the first embodiment as described above. The control system also has an image composite unit 300. The image composite unit 300 adds an identification mark to the printing image data supplied from the image processing unit 102 and outputs composite image data. The composite image data is supplied from the image composite unit 300 to the printer unit 103.

Figure 10:
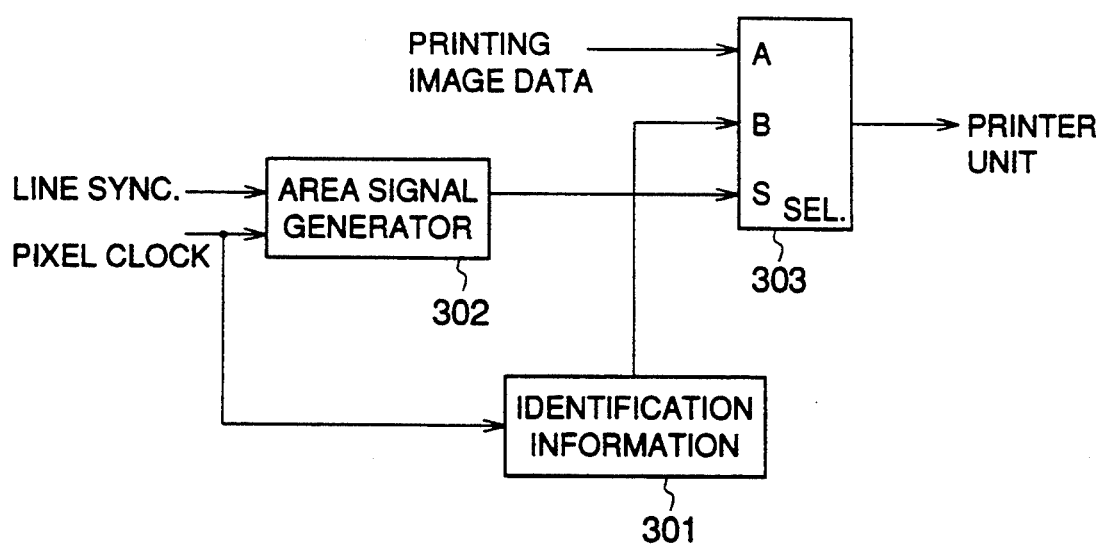
FIG. 10 is a block diagram illustrating an example of an image composite unit shown in FIG. 9.

The image composite unit 300 is formed, for example, as shown in FIG. 10.

Figure 11:
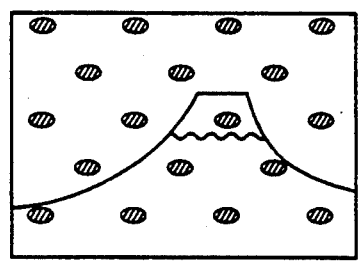
FIG. 11 is a diagram illustrating identification marks formed in an image.

Referring to FIG. 10, the image composite unit 300 has an identification information generator 301, an area signal generator 302 and a selector 303. The identification information generator 301 outputs image data indicating identification information of this copy machine, in synchronism with a pixel clock signal. The image data indicating the identification information is referred to as an identification mark. The identification mark indicates, for example, a machine type number or a serial number of this copy machine. The area signal generator 302 generates an area signal in synchronism with a line synchronous signal and the pixel clock signal. The area signal is activated at predetermined intervals. The selector 303 has two input terminals A and B and a control terminal S. The printing image data (for at least one of cyan, magenta, yellow and black colors), the identification mark output from the identification generator 301, and the area signal output from the area signal generator 302 are respectively supplied to the input terminals A and B and the control terminal S of the selector 303. When the area signal supplied to the control terminal S is inactive, the selector 303 elects the printing image data supplied to the input terminal A. In this case, the printing image supplied from the image processing unit 102 is supplied to the printer unit 103 as it is. When the area signal is active, the selector 303 selects the identification information supplied to the input terminal B. In this case, the identification information is supplied to the printer 103. As a result, a composite image data formed of the printing image data and the identification marks are printed on the recording sheet by the printer unit 103, as shown in FIG. 11. In FIG. 11, the identification marks are formed on areas indicated by slanting lines.

Figure 12:
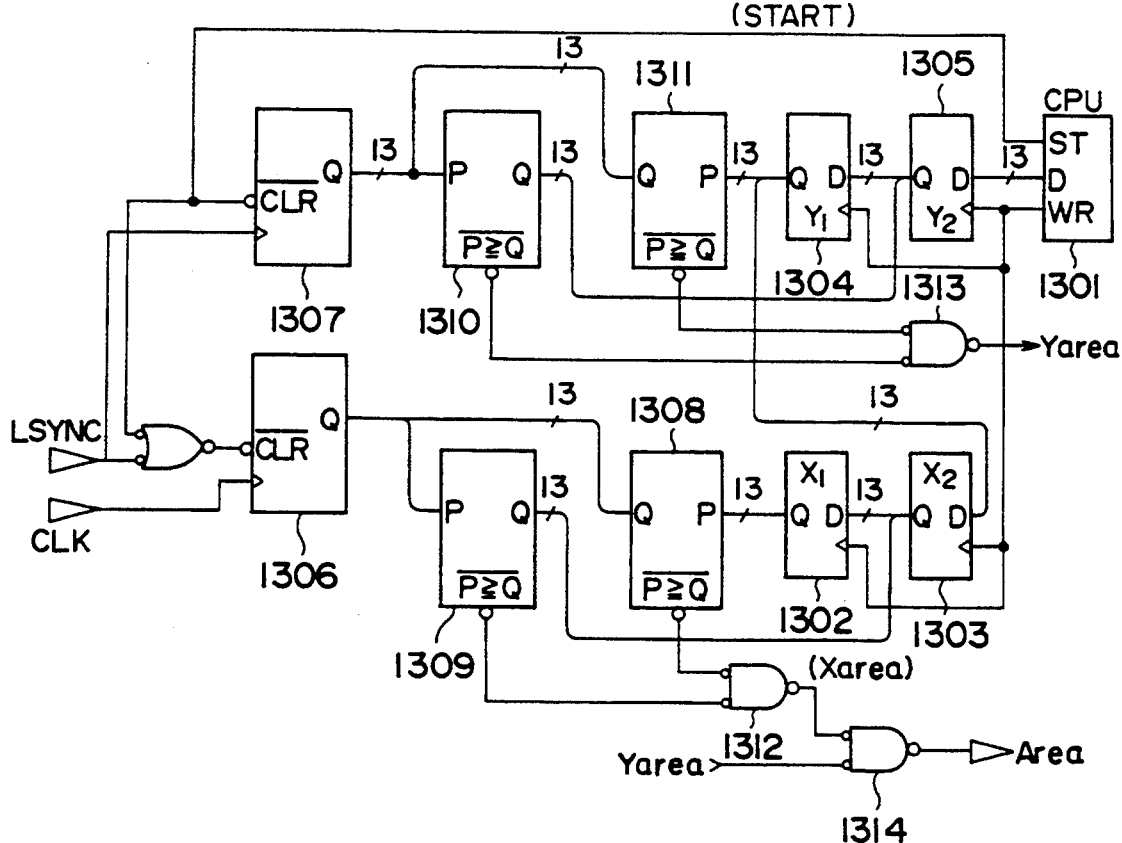
FIG. 12 is a circuit diagram illustrating an area signal generator shown in FIG. 10.

The area signal generator 302 is formed, for example, as shown in FIG. 12.

Figure 13:
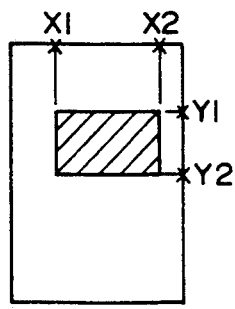
FIG. 13 is a diagram illustrating an area identified by coordinates.
Figure 14A:
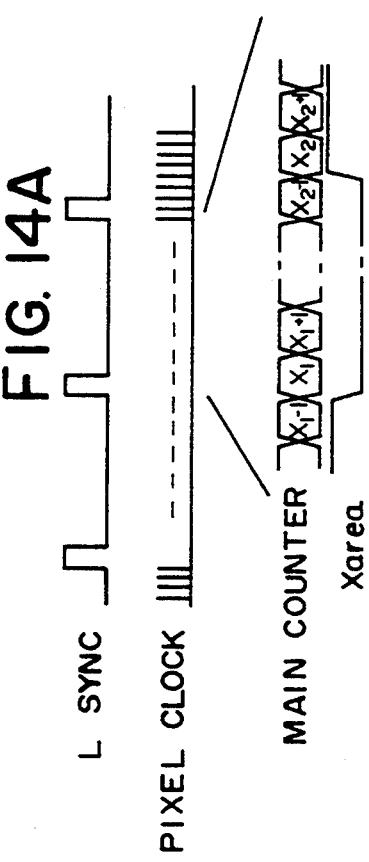
FIG. 14A and 14B are timing charts illustrating signals generated in the area signal generator shown in FIG. 12.
Figure 14B:
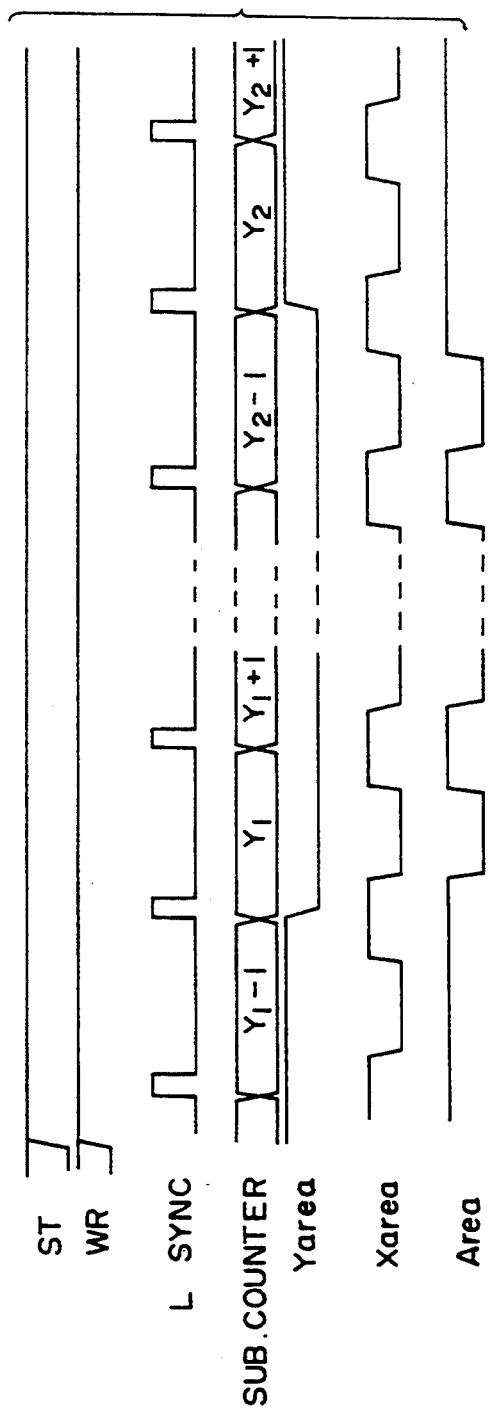

Referring to FIG. 12, the area signal generator 302 has a CPU 1301, an X-area system and a Y-area system. The X-area system has registers 1302 and 1303, comparators 1308 and 1309 and a main counter 1306. The Y-area system has registers 1304 and 1305, comparators 1310 and 1311 and a sub counter 1307. The CPU 1301 outputs area data identifying a rectangular area as shown in FIG. 13. The area data includes X-coordinates X1 and X2 and Y-coordinates Y1 and Y2. The X-coordinates X1 and X2 are set in the registers 1302 and 1303. The Y-coordinates Y1 and Y2 are set in the registers 1304 and 1305. The main counter 1306 counts the pixel clock signal, and is reset by either the line synchronous signal and a start signal ST supplied from the CPU 1301. The sub counter 1307 counts the line synchronous signal, and is reset by the start signal ST supplies from the CPU 1301. The comparator 1308 compares the count value of the main counter 1306 with the X-coordinate X1 set in the register 1302. When the counter value (Q) reaches to the X-coordinate X1 (P), the comparator 1308 output a detecting signal. The comparator 1309 compares the count value of the main counter 1306 with the X-coordinate X2 set in the register 1303. When the count value (Q) reaches to the X-coordinate X2 (P), the comparator 1309 outputs a detecting signal. The detecting signals output from the comparators 1308 and 1309 are input to an OR gate 1312, and the OR gate 1312 outputs an Xarea signal indicating a region between X1 and X2, as shown in FIG. 14A. The detecting signals output from the comparators 1311 and 1310 are input to an OR gate 1313, and the OR gate 1313 outputs a Yarea signal indicating a region between Y1 and Y2, as shown in FIG. 14B. The Xarea signal and the Yarea signal are supplied to an OR gate 1314, the OR gate 1314 outputs an area signal Aarea as shown in FIG. 14B. When the area signal Aarea is active, a pixel to be processed is in the area shown in FIG. 13. The CPU 1301 successively updates the area data at predetermined intervals, so that the area signal Aarea identifying the area shown in FIG. 11. is output from the area signal generator 302.

Each of the areas on which the identification mark is to be formed is very small, for example, the length thereof is approximately 1 mm.

The identification mark to be printed on an color image formed on the recording sheet is formed, for example, as shown in FIG. 15. That is, the identification mark may be formed of numerals as shown in FIG. 15(a). In this case, the identification information such as the machine type number and the serial number of the copy machine is indicated by numerals. The identification mark may be formed of a bar code as shown in FIG. 15 (b). In this case, the identification information is indicated by a bar code. The bar code can represent a large amount of information. The identification mark may be formed of mosaic patterns as shown in FIG. 15 (c). In this case, the identification information is indicated by mosaic patterns.

According to the second embodiment, identification marks are formed on the recording sheet along with a color image. Thus, even if bills or securities are illegally copied, the copy machine can be follow up based on the identification mark formed on the copy. In addition, as the identification marks are very small, the quality of a color image obtained by copy of a normal original does not deteriorate.

It is preferable that the identification mark is added to the printing image data of the yellow color so that the identification mark is printed by yellow. Since the yellow identification mark is inconspicuous in the color image formed on the recording sheet, the deterioration of the quality of the color image is smaller than that in a case where the identification mark is printed by another color.

Figure 16A:
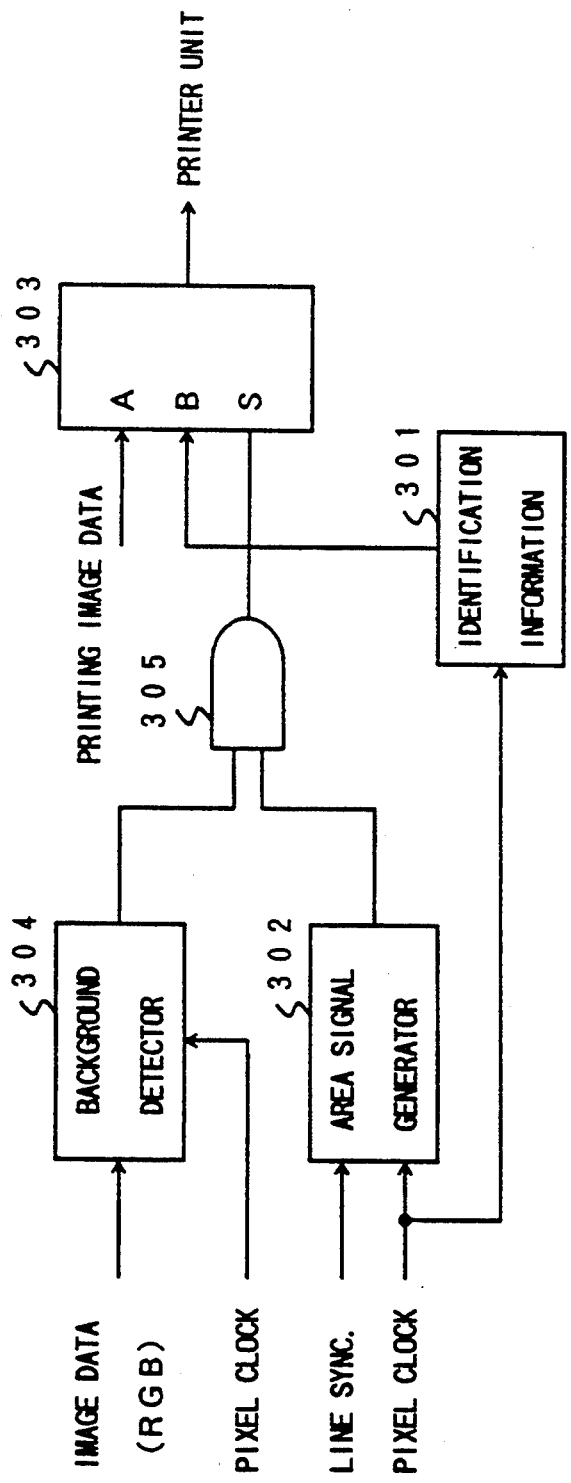
FIG. 16A is a block diagram illustrating an example of the image composite unit shown in FIG. 9.

A description will now be given, with reference to FIG. 16A, FIG. 16B and FIG. 17, of a third embodiment of the present invention. In the third embodiment, the identification marks are formed on a background of a color image. A copy machine has the same structure as that shown in FIG. 1.

In the third embodiment, the image composite unit 300 shown in FIG. 9 is formed as shown in FIG, 16A. Referring to FIG. 16A, the image composite unit 300 has the identifications information generator 301, the area signal generator 302 and the selector 303 in the same manner as that shown in FIG. 10. The image composite unit 300 in the third embodiment also has a background detector 304 to which the image data (RGB) supplied from the image reader unit 101 is input, and which detects a background of the image read by the image reader unit 101.

Figure 16B:
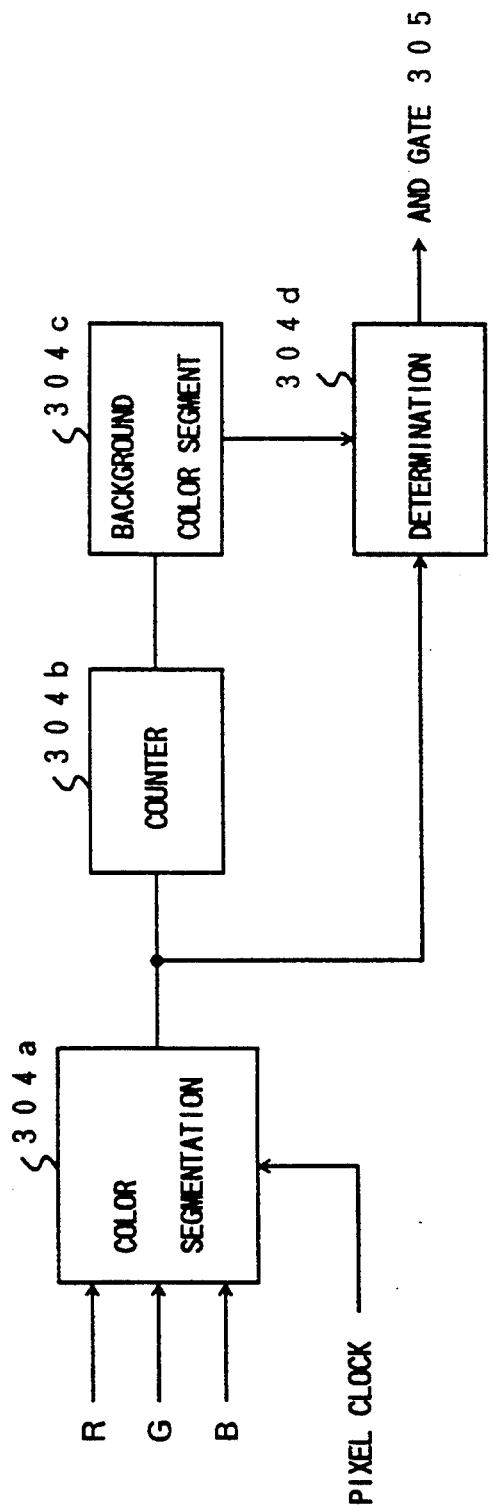
FIG. 16B is a block diagram illustrating a background detector shown in FIG. 16A
Figure 17:
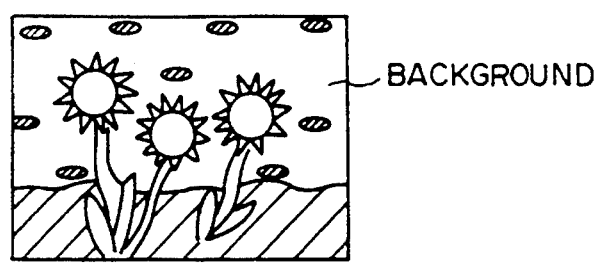
FIG. 17 is a diagram illustrating identification marks formed on a background of an image.

The background detector 304 is formed as shown in FIG. 16B. Referring to FIG. 16B, the background detector 304 has a color segmentation circuit 304a, a counter 304b and a background color segment detector 304c and a determination circuit 304d. The color segmentation circuit 304a has the following color segmentation table.

TABLE

| COL. | LEVEL | | | | | | | |
| --- | --- | --- | --- | --- | --- | --- | --- | --- |
| | 1 | 2 | 3 | 4 | 5 | 6 | 7 | 8 |
| R | 0–7 | 8–15 | 16–31 | 32–63 | 64–95 | 96–143 | 144–191 | 192–255 |
| G | 0–7 | 8–15 | 16–31 | 32–63 | 64–95 | 96–143 | 144–191 | 192–255 |
| B | 0–7 | 8–15 | 16–31 | 32–63 | 64–95 | 96–143 | 144–191 | 192–255 |

The image data supplied from the image reader unit 101 is formed of color data (R) for red, color data (G) for green and color data (B) for blue. In the color segmentation table, the color data is classified into 8 levels in accordance with density ranges. Thus, the image data formed of color data (R) (G) and (B) is classified into 512 color segments.

The image reading unit 101 performs a pre-scanning operation in which an original is read without operation of the printer unit 103. In the pre-scanning operation, the image data formed of the color data (R) (G) and (B) output from the image reader unit 101 is supplied to the color segmentation circuit 304a. The color segmentation circuit 304a determines, with reference to the color segmentation table, which of the color segments does the image data belong to. The counter 304b counts the number of items of image data belonging to each color segment. A color segment to which the maximum number of items of the image data has belonged is determined as a background color segment by the background color segment detector 304c. The background color segment is stored in the background color segment detector 304c.

After the pre-scanning operation, the image reader unit 101 reads the original under a condition in which the printer unit 103 is active. In this case, the image data is supplied to the color segmentation circuit 304a and a color segment to which the image data belongs is output from the color segmentation circuit 304a. The determination circuit determines whether or not the color segment output from the color segmentation circuit 304a is equal to the background color segment stored in the background color segment detector 304c. When it is determined that the color segment is equal to the background color segment, the determination circuit 304d activates a background detecting signal. The background detecting signal is supplied from the determination circuit 304d to the AND gate 305.

In the above background detector 304, it is determined that the color segment to which the maximum number of items of image data has belonged corresponds to the background of the color image.

The area signal output from the area signal generator 302 is supplied to the AND gate 305, and the output signal of the AND gate 305 is supplied to the control terminal S of the selector 303. Thus, selector 303 selects the identification mark every time both the area signal and the background detecting signal is activated. Thus, the identification marks are formed on the background of the color image at predetermined intervals as shown in FIG. 17.

According to the third embodiment, as the identification marks are formed on the background of the color image, the quality of the color image is not deteriorated by the identification marks.

A description will now be given, with reference to FIG. 18A and FIG. 18B, of a fourth embodiment of the present invention. In the fourth embodiment, the identification mark is formed as a negative image on the background of the color image.

Figure 18A:
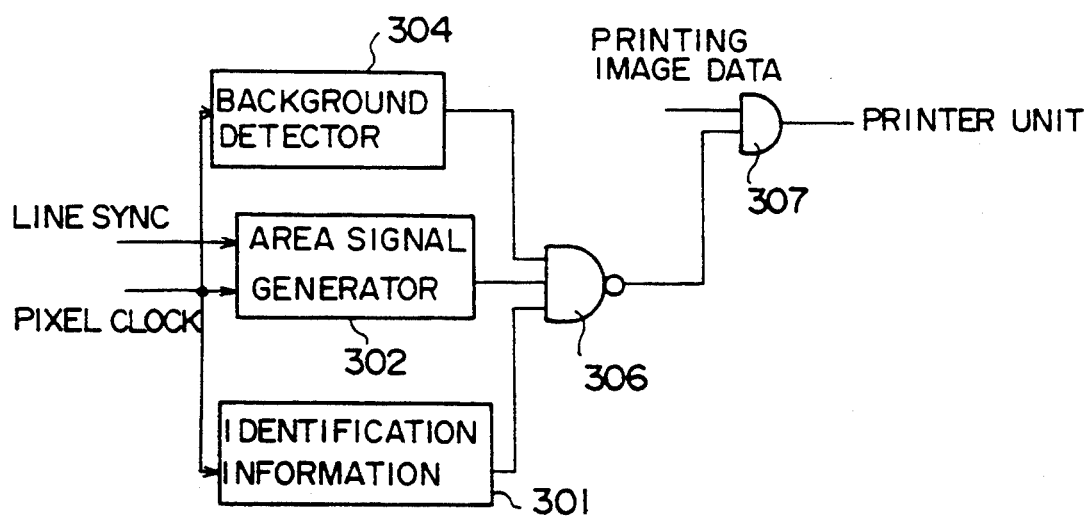
FIG. 18A is a block diagram illustrating an example of the image composite unit shown in FIG. 9.
Figure 18B:
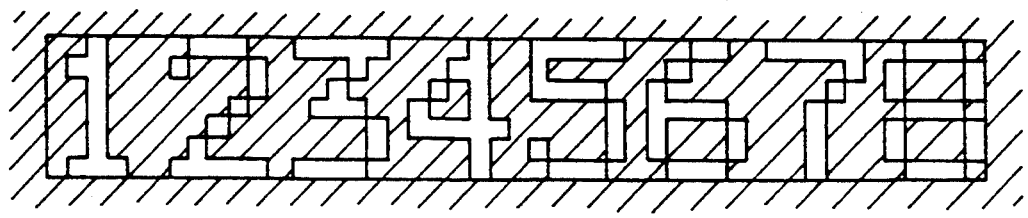
FIG. 18B is a diagram illustrating an example of the identification mark.

In the fourth embodiment, the image composite unit 300 is formed as shown in FIG. 18A. Referring to FIG. 18A, the image composite unit 300 has the identification information generator 301, the area signal generator 302 and the background detector 304. The image composite unit 300 also has a NAND gate 306 and an AND gate 307. The identification information generator 301, the area signal generator 302 and the background detector 304 respectively outputs the identification mark, the area signal and the background detecting signal in the same manner as those in the above third embodiment. The identification mark and the area signal and the background detecting signal are of the NAND gate 306 and the printing image data supplied from the image processing unit 102 are supplied to the AND gate 307. The output signal of the AND gate 307 is supplied to the printer unit 103.

In the image composite circuit 300 shown in FIG. 18A, when at least one of the identification mark, the area signal and the background detecting signal is inactive, the output signal of the NAND gate 306 is active. As a result, the printing image data is supplied to the printer unit 103 as it is via the AND gate 307. On the other hand, when all the identification mark, the area signal and the background signal are activated, the output signal of the NAND gate 306 is inactive. As a result, the output signal is maintained to be inactive. That is, in this case, the half tone data "0" corresponding to white data is supplied to the printer unit 103. Thus, the identification mark is formed as a negative image on the background of the color image as shown in FIG. 18B.

According to the fourth embodiment, as the background of a color image corresponding to a normal original generally has a light color, the identification mark formed as the negative image of the background of the color image corresponding to the normal original is inconspicuous. On the other hand, as the background of a color image corresponding to each of bills generally has a dark color, the identification mark formed as the negative image of the background of the color image corresponding to each of bills is conspicuous.

A description will now be given, with respect to FIG. 19, FIG. 20, FIG. 21 and FIG. 22, of a fifth embodiment of the present invention. In the fifth embodiment, the identification mark is formed on a graphics area in an color image.

Figure 19:
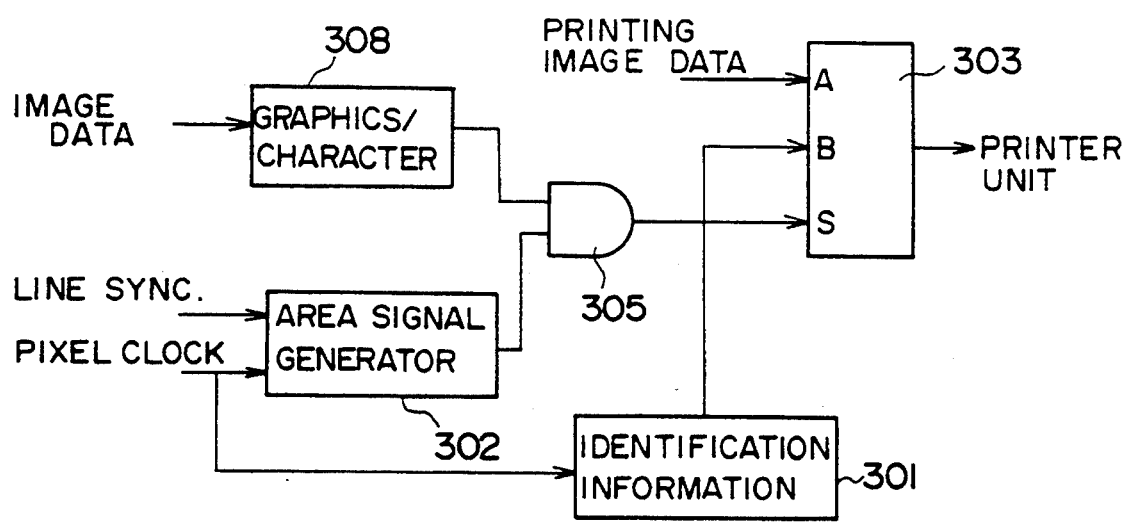
FIG. 19 is a block diagram illustrating an example of the image composite unit shown in FIG. 9.

In the fifth embodiment, a copy machine, has the same structure as that shown in FIGS. 1 and 9, and the image composite unit 300 is formed as shown in FIG. 19.

Referring to FIG. 19, the image composite unit 300 has the identification information generator 301, the area signal generator 302 and the selector 303. The identification information generator 301 and the area signal generator 302 respectively outputs the identification mark and the area signal in the same manner as those in the third embodiment as shown in FIG. 16A. The image composite unit 300 also has an area determination circuit 308 for determining whether image data corresponds to graphics or characters. The area determination circuit 308 outputs on area determination signal. When the image data corresponds to the graphics, the area determination signal is active. The area signal output from the area signal generator 302 and the area determination signal output from the area determination circuit 308 are input to the AND gate 305. The output signal of the AND gate 305 is supplied to the control terminal S of the selector 303. When the output signal of the AND gate 305 is active, the selector 303 selects the identification mark. On the other hand, when the output signal of the AND gate 305 is inactive, the selector 303 selects the printing image data supplied from the image processing unit 102.

Figure 20:
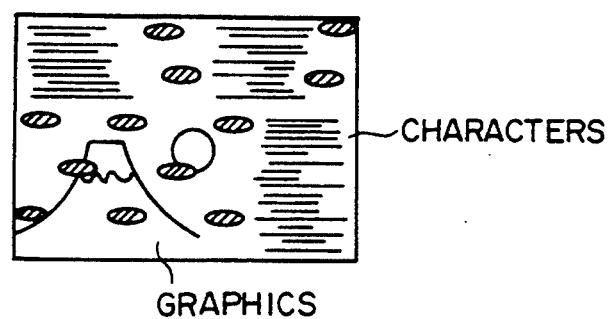
FIG. 20 is a diagram illustrating identification marks formed in graphics of an image.

According to the fifth embodiment, the identification marks are formed on the graphics area of the color image at predetermined intervals as shown in FIG. 20. That is, the identification marks do not overlap with characters.

Figure 21:
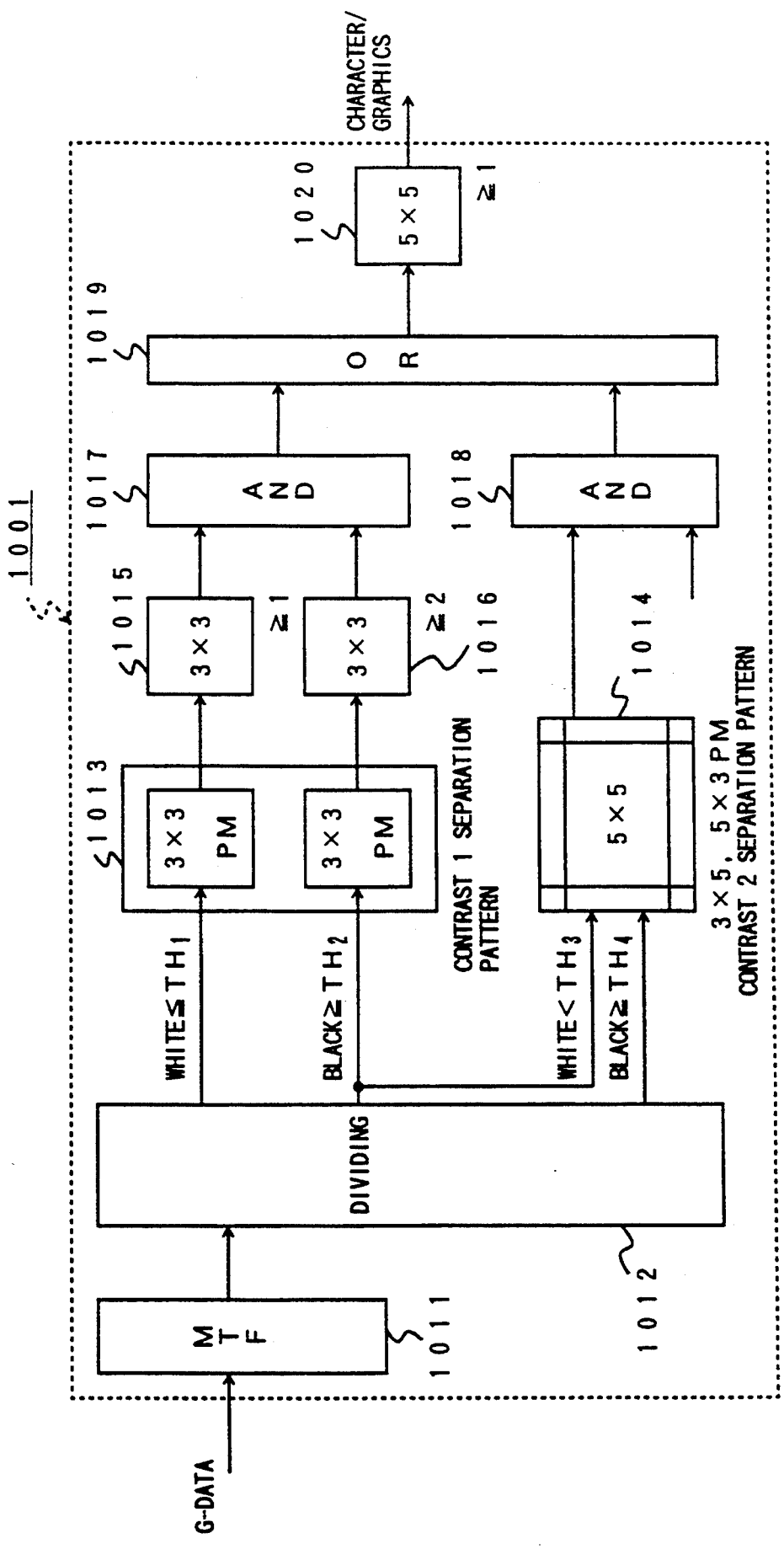
FIG. 21 is a block diagram illustrating a character edge detecting unit included in an area determination circuit shown in FIG. 19.
Figure 22:
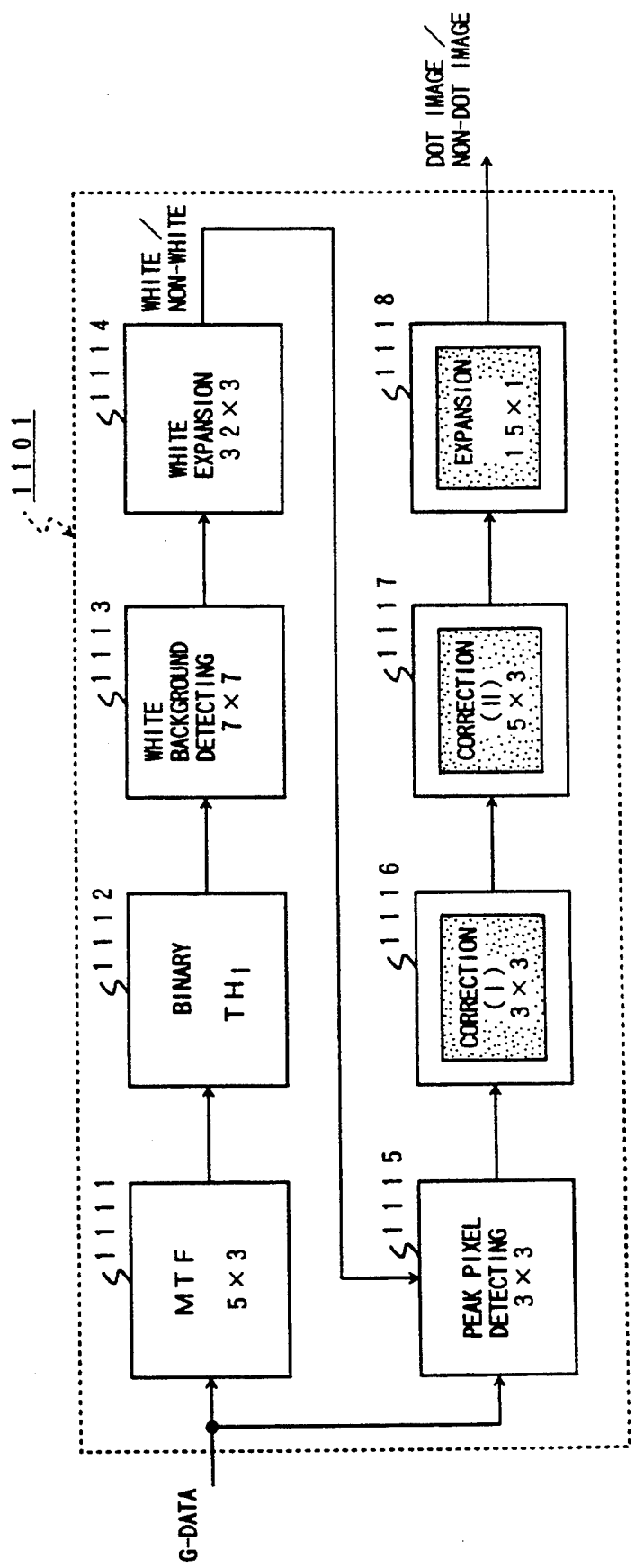
FIG. 22 is a block diagram illustrating a dotted image detecting unit included in the area determination circuit shown in FIG. 19.

The area determination circuit 308 has a character edge detecting unit as shown in FIG. 21 and a dotted image detecting unit as shown in FIG. 22. The character edge separation unit determines whether or not the image data corresponds to an edge of a character. The dotted image detecting unit determines whether or not the image data corresponds to a dotted image. When the character edge separation unit determines that the image data corresponds to the edge of a character and the dotted image detecting unit determines that the image data does not correspond to a dotted image, the area determination circuit 308 determines that the image data corresponds to the characters. In other cases, the area determination circuit 308 determines that the image data on an area other than the background corresponds to the graphics.

Referring to Fig. 21, the character edge detecting unit 1001 has an MTF correction circuit 1011, a dividing circuit 1012, a first pattern matching circuit 1013, a second pattern matching circuit 1014, a pixel determination circuits 1015 and 1016, AND gates 1017 and 1018, an OR gate 1019 and an edge determination circuit 1020. The color data (G) is supplied to the character edge detecting circuit 1001. The MTF correction circuit 1011 corrects the deterioration of the MTF (modulation transfer function) of the color data (G). The color data processed by the MTF correction circuit 1011 is classified into three density ranges, a black range, a half-tone range and a white range, in two channels. The first channel has a wide black range and the second channel has a wide white range. In the first channel, it is determined that each pixel having the color data belongs to characters by a pattern matching process using $3 \times 3$ matrixes. In the second channel, it is determined that each pixel having the color data belongs to characters by a pattern matching using a $5 \times 5$ matrix.

When, in at least one of the first and second channels, each pixel belongs to characters, the character edge determination circuit 1020 activates a character edge detecting signal.

Referring to FIG. 22, the dotted image detecting unit 1101 has an MTF correction circuit 1111, a binary circuit 1112, a white dot detecting circuit 1113, a white background expansion circuit 1114, a peak pixel detecting circuit 1115, correction circuits 1116 and 1117 and an expansion circuit 1118. In the dotted image detecting unit 1101, the color image is classified into a dotted image and another image based on whether or not there is a peak pixel. The peak pixel is defined as a pixel of which density (image data) is maximum or minimum and a Laplacian value in four directions is equal to or greater than a threshold value. The white background expansion circuit 1114 determines whether or not a pixel having the input color data belongs to a white background. The peak detecting circuit 1115 select a threshold level used for detecting a peak pixel from among a plurality of threshold levels, based on the determination result obtained by the white background expansion circuit 1114. On the white background, the threshold level is high so that a character is not determined as a dotted image. In the correction circuits 1116 and 1117 and the expansion circuit 1118, the color data for every block formed of $4 \times 4$ dots is processed.

A description will now be given, with reference to FIG. 23, of a sixth embodiment, of the present invention.

In the sixth embodiment, identification marks are formed on non-character area in the background of the color image.

Figure 23:
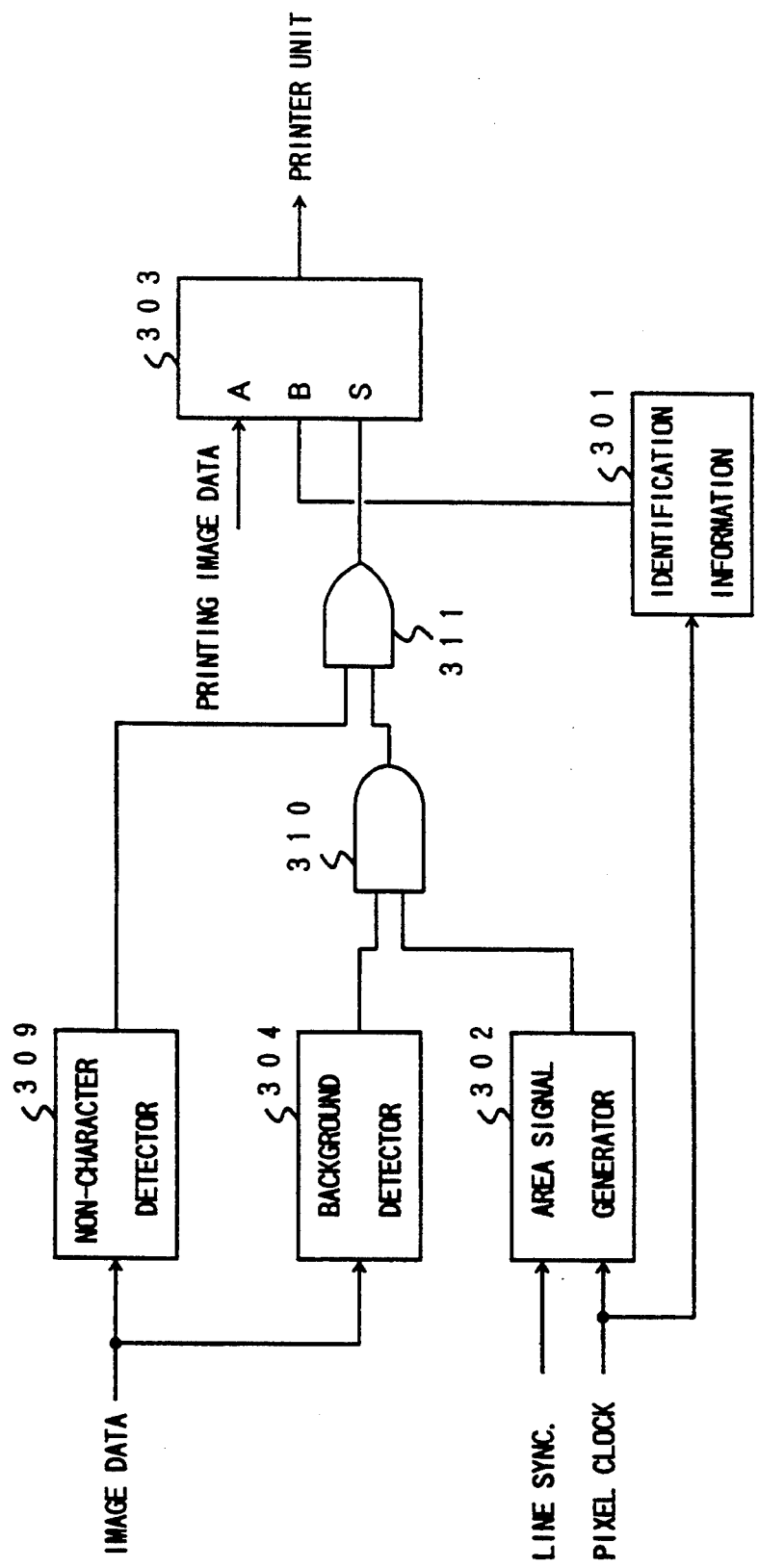
FIG. 23 is a block diagram illustrating an example of the image composite unit shown in FIG. 9.

In the sixth embodiment, a copy machine has the same structure as that shown in FIG. 1 and FIG. 9, and the image composite unit 300 is formed as shown in FIG. 23.

Referring to FIG. 23, the image composite unit 300 has the identification information generator 301, the area signal generator 302, the selector 303, and the background detector 304. The image composite unit 300 also has a non-character detector 309, and AND gates 310 and 311. The identification information generator 301, the area signal generator 302 and the background detector 304 respectively outputs the identification mark, the area signal and the detecting signal in the same manner as those shown in FIG. 16A. The non-character detector 309 has the same structure as the area determination circuit 308 shown in FIG. 19. When the image data corresponds to a character, an area detecting signal in inactive. The area signal from the area signal generator 302 and the detecting signal from the background detector 304 are input to the AND gate 310. When the image data corresponds to an image other than a character, the detecting signal output from the non-character detector 309 is active. The detecting signal from the non-character detector 309 and the output signal of the AND gate 310 are input to the AND gate 311. The output signal of the AND gate 311 is supplied to the control terminal S of the selector 303. Thus, when the output signal of the AND gate 311 is active, the selector 303 selects the identification mark supplied to the input terminal B. On the other hand, when the output signal of the AND gate 311 is inactive, the selector 303 selects the printing image data supplied from the image processing unit 102 to the input terminal A. That is, when all the area signal, the detecting signal from the background detector 304 and the detecting signal from the non-character detector 309 are active, the identification mark is supplied from the selector 303 to the printer unit 103.

According to the sixth embodiment, the identification marks are formed on the non-character area of the color image at predetermined intervals. That is, the identification marks do not overlap with characters.

Figure 24A:
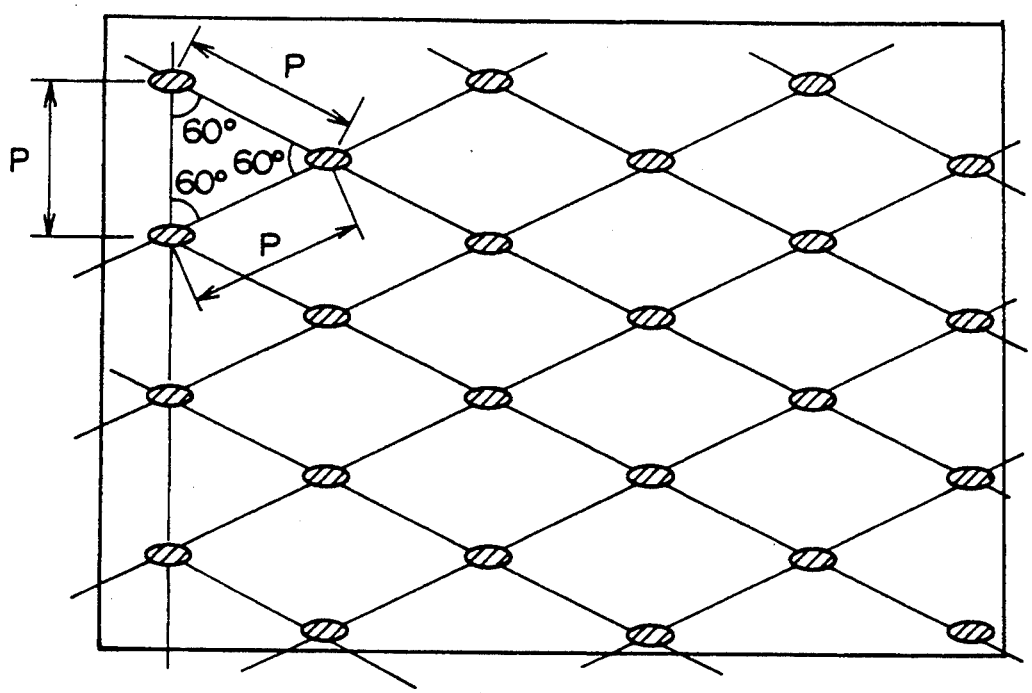
FIG.24A is a diagram illustrating the arrangement of the identification marks formed on a recording sheet.
Figure 24B:
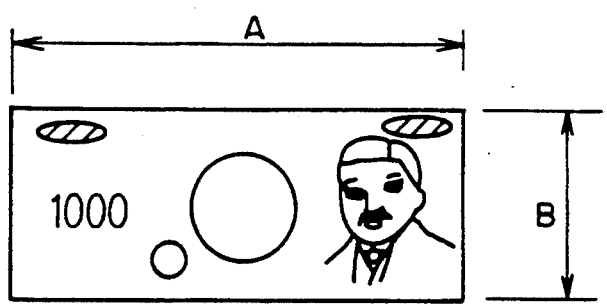
FIG. 24B is a diagram illustrating the identification marks formed on a copied bill.

The identification marks formed on a color image are arranged, for example, as shown in FIG. 24A. Referring to FIG. 24A, identification marks are arranged at intervals P in a lattice inclined by 60°. The identification marks are formed on a copied bill, for example, as shown in FIG. 24B. The bill has the longitudinal length A and the transverse length B. The interval P at which the identification marks are arranged as shown in FIG. 24A is set a value, for example, less than the transverse length B of the bill.

A description will now be given, with reference to FIGS. 25, 26, 27, 28, 29 and 30. In the seventh embodiment, the color image and identification marks are formed on a recording sheet using dither matrix patterns. The dither matrix patterns used for forming the color image differ from those used for the identification marks.

Figure 25:
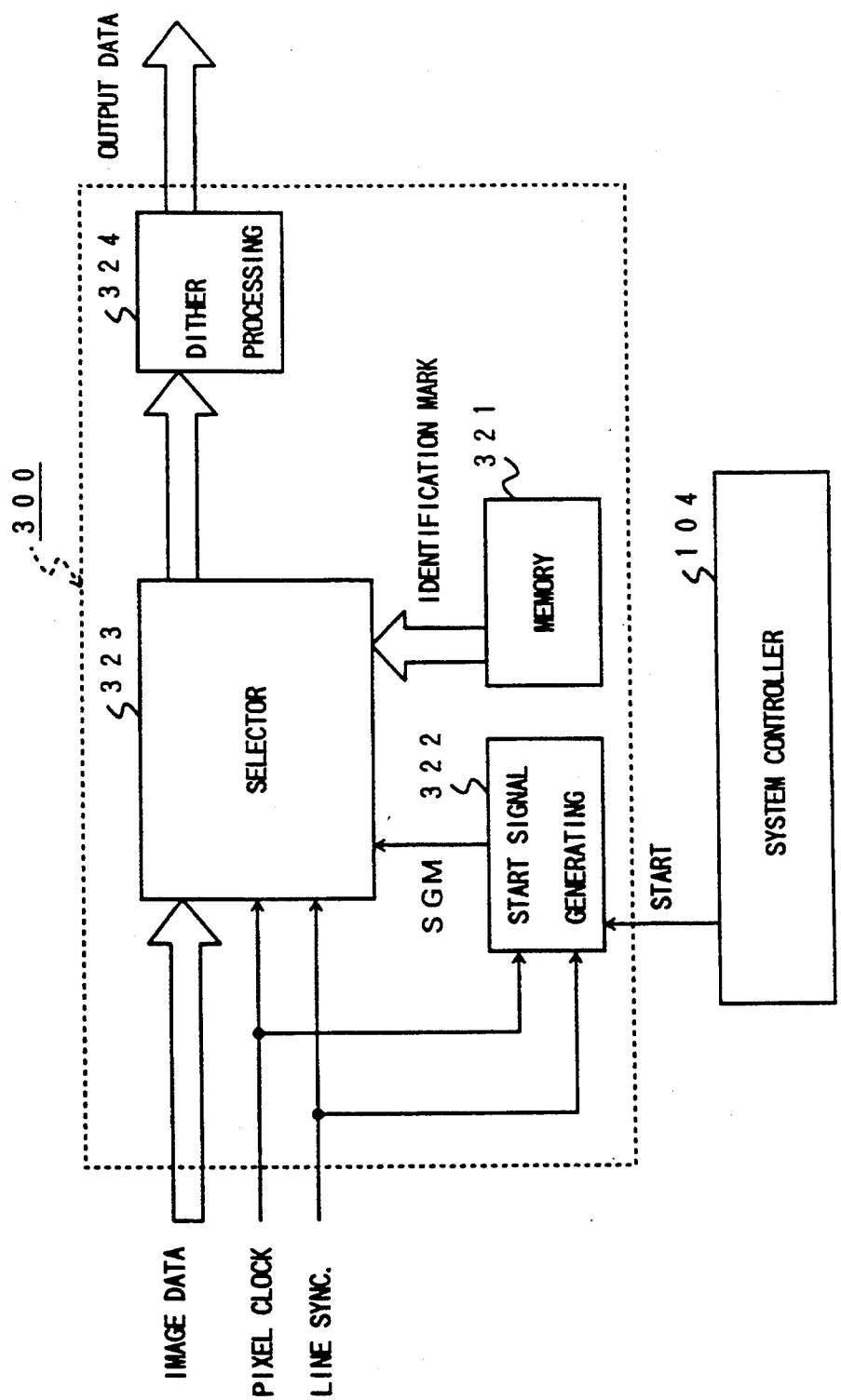
FIG. 25 is a diagram illustrating an example of the image composite unit shown in FIG. 9.

In the seventh embodiment, a copy machine has the same structure as that shown in FIG. 1 and FIG. 9, and the image composite unit 300 is formed as shown in FIG. 25.

Referring to FIG. 25, the image composite unit 300 has a memory 321, a start signal generating circuit 322, a selector 323 and a dither processing circuit 324. An identification mark identifying this copy machine is stored in the memory 321. A pixel clock signal and a line synchronous signal are supplied to the start signal generating circuit 322 and the selector 323 so that the start signal generating circuit 322 and the selector 323 are operated in synchronism with the pixel clock signal and the line synchronous signal. The start signal generating circuit 322 outputs a composite start signal (SGM) in accordance with an instruction from the system controller 104. The selector 323 is provided with the image printing data supplied from the image processing unit 102 and the identification mark output from the memory 321, and selects either the image printing data or the identification mark based on the level of the composite start signal (SGM). The printing image data and the identification mark are supplied to the dither processing circuit 324 via the selector 323. The dither processing circuit 324 processes the printing image data and the identification mark in accordance with the dither method by which the dot area modulation is performed. In the dither processing circuit 324, dither matrix patterns used for the printing image data differ from dither matrix patterns sued for the identification mark.

The identification mark stored in the memory 321 will be described bellow.

The identification mark is indicated by a combination of a plurality of elements each of which are formed of a 2×2 dot matrix as shown in FIG. 26. Each of the elements of the identification mark is referred to as an element mark. A start element mark indicating a head of the identification mark is formed of two 2×2 dot matrixes, as shown in FIG. 26 (a), in which all dots are white and black respectively. An end element mark indicating a tail end of the identification mark is also formed of two 2×2 dot matrixes, as shown in FIG. 26 (g), in which all dots are black and white respectively. Other element marks formed of 2×2 dot matrixes shown in FIG. 26 (b), (c), (d), (e), (f), (g), (h), (i), (j), (k) and (l) respectively indicates numerals 0-9. Each of these element marks is referred to as a numeral element mark. In an identification mark, numeral element marks are arranged between the start element mark and the end element mark in a transverse direction (a main scanning direction), and the start element mark, the end element mark and the numeral element marks are put between 2×2 doe matrixes in which all dots are white, in a longitudinal direction (a sub scanning direction). A string of the numeral element marks between the start element mark and the end element mark represents, for example, a machine number, or a serial number identifying this copy machine. An identification mark shown in FIG. 27 indicates a machine number "933".

If each of the element marks is formed of a dot matrix greater than 2×3 dot matrix or 3×2 dot matrix, the element marks can indicate capital alphabetical letters, small alphabetical letters and numerals. Each of dots forming each element mark may has a half-tone level which is not too low. It is preferable that each of dots have the maximum half-tone level.

Figure 28A:
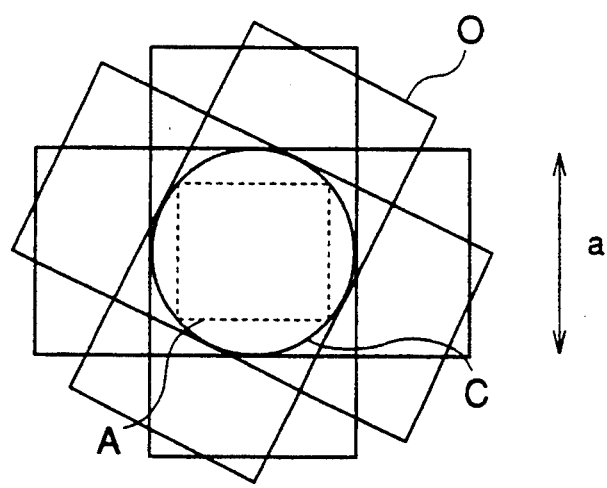
FIG. 28A and FIG. 28B are diagrams illustrating an area on which an identification mark is to be formed.

The identification marks are arranged on an printed image in a predetermined density. Special originals such as bills and securities are generally rectangular. Thus, if the special original O is rotated on a center thereof, as shown in FIG. 28A, a circle C can be drawn at a center portion of the special original O. The circle C has a diameter equal to a length a of a short side of the special original O. To print at least one identification mark on a copy of the special original, the identification marks may be arranged in a density (p) calculated in accordance with the following equation (1).

$$p=(a/2)\times(a/2)X\pi \qquad (1)$$

Figure 28B:
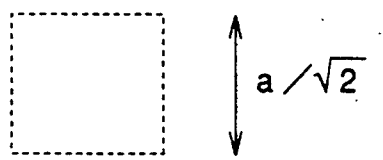

The start signal generating circuit 322 generates the composite start signal (SGN) using a count value of the pixel clock signal (in the main scanning direction) and a count value of the line synchronous signal (in the sub scanning direction). The count value of the pixel clock signal corresponds to the density in which identification marks are arranged in the main scanning direction. The count value of the line synchronous signal corresponds to the density in which identification marks are arranged in the sub scanning direction. In this embodiment, the composite start signal (SGN) is generated at intervals corresponding to a rate in which one identification mark is in an square having sides of $a/\sqrt{2}$ as shown in FIG. 28B.

Figure 29:
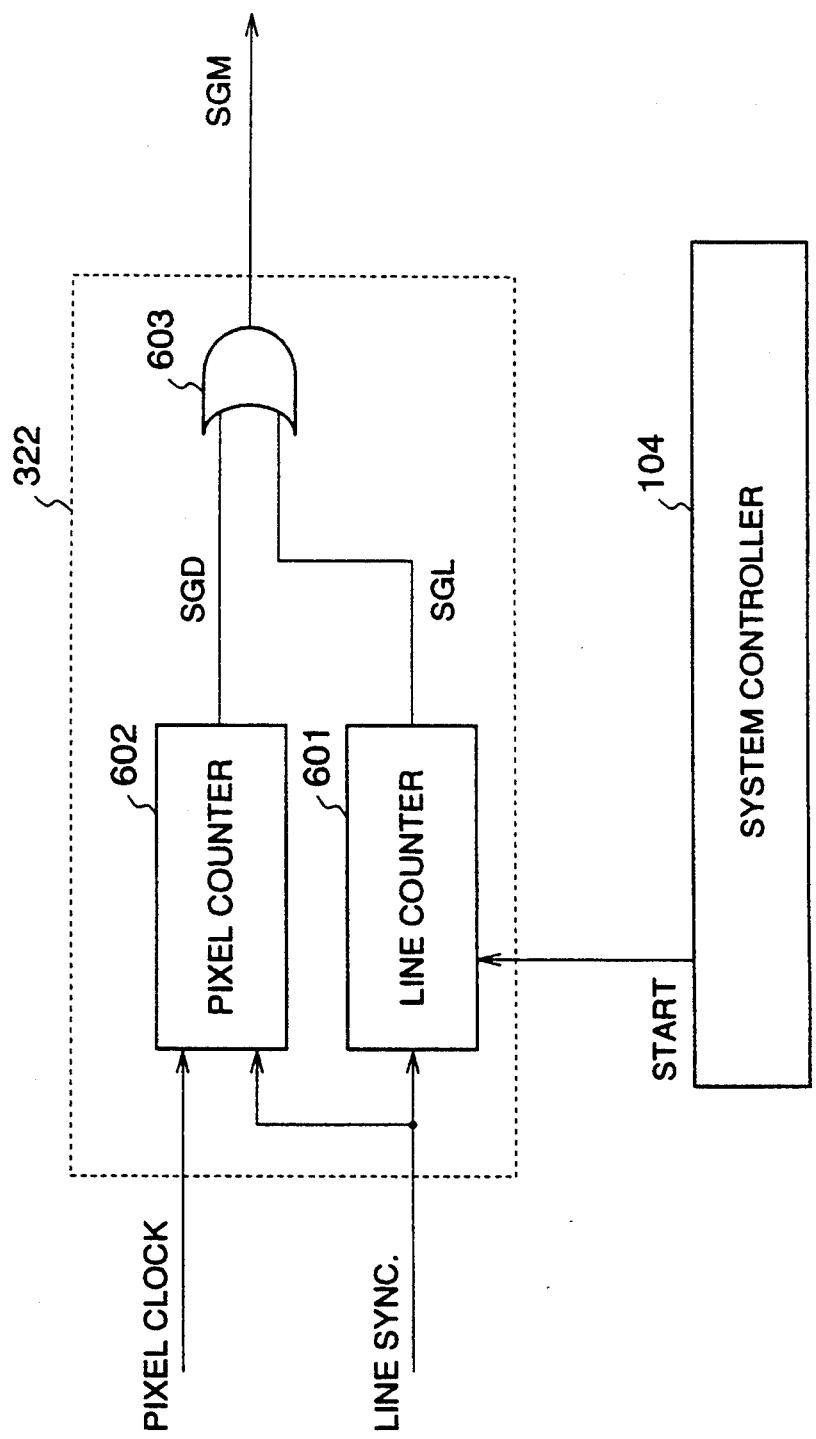
FIG. 29 is a block diagram illustrating a start signal generating circuit shown in FIG. 25.

The start signal generating circuit 322 is formed as shown in FIG. 29. Referring to FIG. 29, the signal generating circuit 322 has a line counter 601, a pixel counter 602 and an OR gate 603. The line counter 601 counts the line synchronous signal and outputs a sub-scanning composite start signal (SGL) activated (SGL=L) when a count value reaches maximum value b less than a value $a/\sqrt{2}$. The pixel counter 602 counts the pixel clock signal and is reset by the line synchronous signal. A main-scanning composite start signal (SGD) output from the pixel counter 602 is activated (SGD=L) when a count value reaches maximum value b less than a value $a/\sqrt{2}$. The OR gate 603 generates, as the composite start signal (SGM), a logical sum of the sub-scanning composite start signal (SGL) and the main-scanning composite start signal (SGD).

Figure 27:
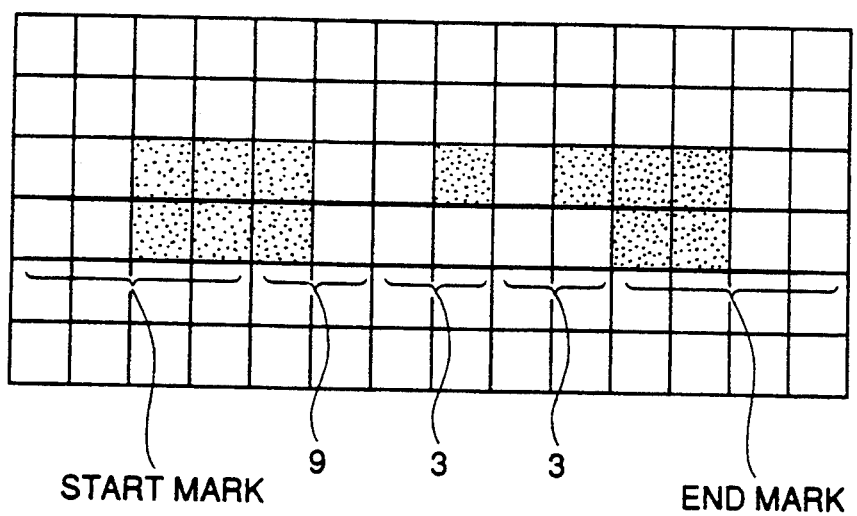
FIG. 27 is a diagram illustrating an example of the identification mark.

The dither processing circuit 324 processes the printing image data and the identification marks in accordance with the dither method. In the dither method, multilevel image data for each pixel is converted into a binary data using a dither matrix in which threshold levels for respective pixels are arranged. The dither processing circuit 324 is provided with four types of dither matrixes for the printing image data of cyan (C), magenta (M), yellow (Y) and black (B) colors. The dither processing circuit 324 is also provided with one type of dither matrix for the identification mark. The size of each of the dither matrix and the threshold levels in each of the dither matrixes are settled so that a printed color image having predetermined quality is obtained. The size of each of the dither matrixes for the printing image data is, for example, 8×8. The dither processing circuit 324 is also provided with a dither pattern for the identification mark. The size of the dither matrix for the identification mark and the threshold levels in the dither matrix for the identification mark are settled so that the identification mark as shown in FIG. 27 can be easily distinguished from the printed color image. The size of the dither matrix for the identification mark is, for example, 6×6. To prevent the pattern of the identification mark as shown in FIG. 27 from deteriorating by the process in accordance with the dither method, it is preferable that each pixel of the identification mark supplied to the dither processing unit 324 have a high density level.

Figure 30:
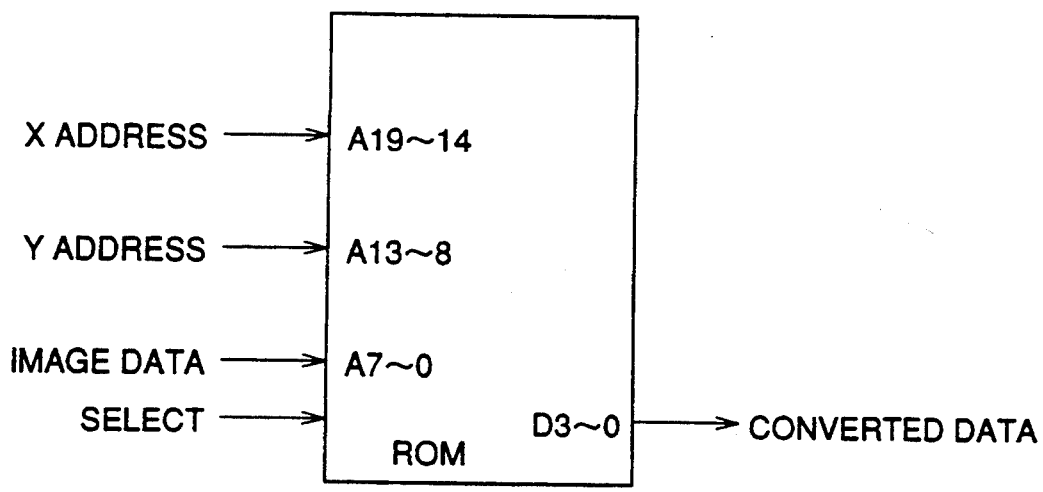
FIG. 30 is a block diagram illustrating a ROM included in a dither processing unit shown in FIG. 25.

The dither processing unit 324 has a ROM as show in FIG. 30. Referring to FIG. 30, image data (the printing image data or the identification mark), a y address indicating a position in a Y-direction in each dither matrix, an X address indicating a position in an X-direction in each dither matrix are supplied to address terminals of the ROM. The X-direction and the Y-direction in each dither matrix respectively correspond to the main scanning direction and the sub scanning direction A pattern select signal (SELECT) is supplied to a control terminal (an address terminal) of the ROM. In a case where the size of the dither matrix is x x y, a count value of a modulo-x counter operating in synchronism with the pixel clock signal is supplied, as the X address, to the address terminal of the ROM, and a count value of a modulo-y counter operating in synchronism with the line synchronous signal is supplied, as the Y address, to the address terminal of the ROM. The modulo-x counter is reset by the line synchronous signal and the modulo-y counter is reset by a frame synchronous signal. The pattern select signal (SELECT) is supplied form the system controller 104 to the ROM. Two types of dither processed data are stored in the ROM, one type of dither processed data corresponding to the dither matrix for the printing image data, and another type of dither processed data corresponding to the dither matrix for the identification mark.

In a case where the identification mark is formed by the yellow toner, the above system is operates as follows.

While the image reading unit 101 is reading on original, the printing image data of the cyan, magenta, yellow and the black is supplied to the image composite unit 300 form the image processing unit 102. when the printing data of the yellow color is to be processed, the start signal generating circuit 322 activates the composite start signal (SGM) at predetermined intervals. Under a condition in which the composite start signal in inactive, the selector 323 selects the printing image data of the yellow color. As a result, the printing image data of the yellow color is supplied to the dither processing unit 324. In the dither processing unit 324, the dither processed data for the printing image data of the yellow color is read out from the ROM. On the other hand, when the composite start signal output from the start signal generating circuit 322 is active, the selector 323 select the identification mark. As a result, the identification data is supplied to the dither processing unit 324. In the dither processing unit 324, the level of the pattern selecting signal (SELECT) is switched so that the dither processed data for the identification mark is read out form the ROM.

As to the printing image data for other colors, the image printing image data is always selected by the selector 323 and is supplied to the dither processing unit 324. As a result, in the dither processing unit 324, the dither processed data for the printing image data is always output from the ROM.

The dither processed data for the printing image data and the identification number are supplied from the ROM of the dither processing unit 324 to the printer unit 103. The color image is printed on a recording sheet and a yellow identification mark is formed in the color image at predetermined intervals.

According to the seventh embodiment, the dither matrix pattern for the identification mark differs from the dither matrix patterns for the printing image data. Thus, even if the identification mark is formed by dot patterns as shown in FIG. 26, the identification mark can be easily distinguished from the printed image.

Figure 31:
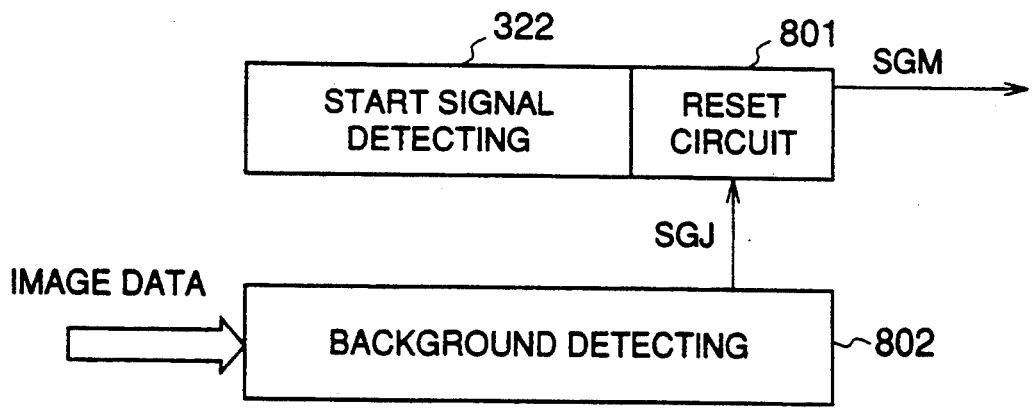
FIG. 31 is a block diagram illustrating an example of a circuit included in the image composite unit shown in FIG. 9.

A description will now be given, with reference to FIG. 31, of an eighth embodiment of the present invention. In the eighth embodiment, identification marks are always formed in images other than the background the color image.

A copy machine has the same structure as that shown in FIG. 1 and FIG. 9.

The image composite unit 300 has the memory 321, the start signal generator 322, the selector 323 and the dither processing unit 324 in the same manner as that shown in FIG. 25. The image composite unit 300 also has a reset circuit 801 and a background detecting circuit 802 as shown in FIG. 31. Referring to FIG. 31, the reset circuit 801 resets the start signal generating circuit 322 in accordance with a detecting signal (SGJ) from the background detecting circuit 802. The background detecting circuit is formed as shown in FIG. 16B and outputs the detecting signal (SGJ). When the background detecting circuit 802 detects the background of the color image, the detecting signal (SGJ) is activated. When the detecting signal (SGJ) is active, both the line counter 601 and the pixel counter 602 of the start signal generating circuit 322 shown in FIG. 29 are reset by the reset circuit. Both the line counter 601 and the pixel counter 602 are maintained in a reset state until the detecting signal (SGJ) output from the background detecting circuit 802 becomes inactive. When the detecting signal (SGJ) becomes inactive, both the line counter 601 and the pixel counter 602 restart the counting operations.

According to the eighth embodiment, as the starting signal generating circuit 322 is reset when the background detecting circuit 802 detects the background of the color image data, the identification marks are not formed in the background of the color image.

Figure 32:
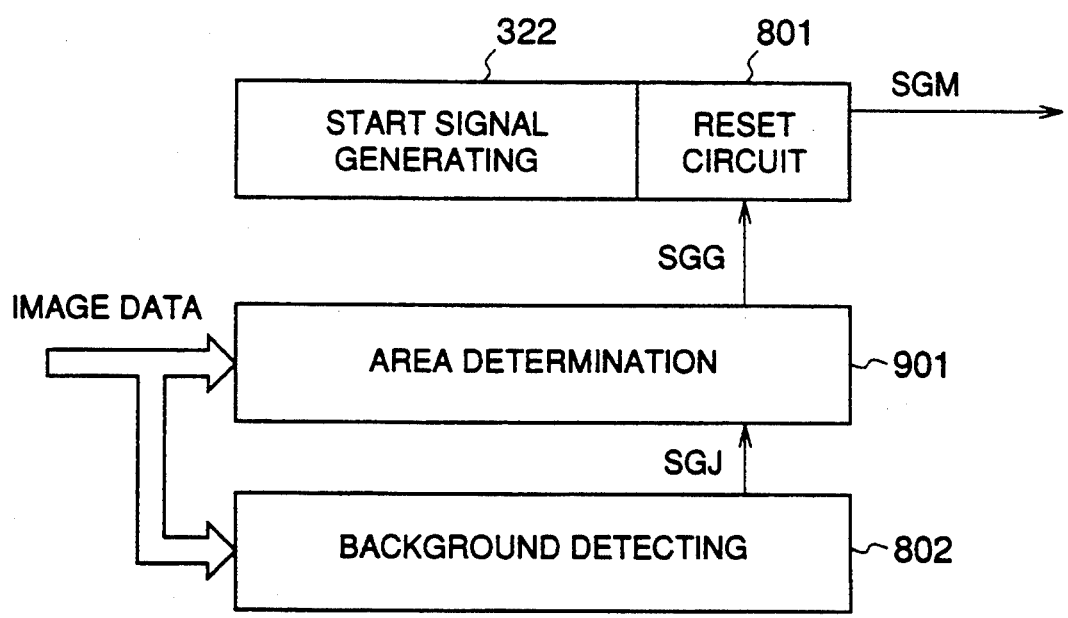
FIG. 32 is a block diagram illustrating an example of the circuit included in the image composite unit shown in FIG. 9.

A description will now be given, with reference to FIG. 32, of a ninth embodiment of the present invention. In the ninth embodiment, the identification marks are formed in graphics areas of the color image.

A copy machine has the same structure as that shown in FIG. 1 and FIG. 9. An area determination circuit 901 is added to the image composite circuit 300 described in the above eighth embodiment, as shown in FIG. 32. Referring to FIG. 32, the area determination circuit 901 is provided between the reset circuit 801 and the background detecting circuit 802. The area determination circuit 901 is formed as shown in FIGS. 21 and 22. When the detecting signal (SGJ) is inactive, the area determination circuit 901 is activated, and determines whether image data corresponds to graphics or characters. When the area determination circuit 901 determines that the image data corresponds to the graphics, the area determination signal (SGG) output from the area determination circuit is active. When the area determination signal (SGG) is inactive the reset circuit 801 resets the start signal generating circuit 322. The reset state is maintained until the area determination signal (SGG) is activated. When the area determination signal (SGG) is activated, the start signal generating circuit 322 is restarted. As a result, the start signal generating circuit 322 restarts the output operation of the composite start signal (SGM), and the identification marks are formed in the color image in synchronism with the composite start signal (SGM).

The identification mark may be formed in a color image by white toner. In this case, the printing image data of the white color corresponds to only the identification mark. A unit having the white toner is added to the developing assembly 25 shown in FIG. 1. A process for forming an white image is simultaneously performed with the process for forming one of the other color images.

A description will now be given, with reference to FIGS. 33, 34, 35, 36 and 37, of a tenth embodiment of the present invention.

Figure 33:
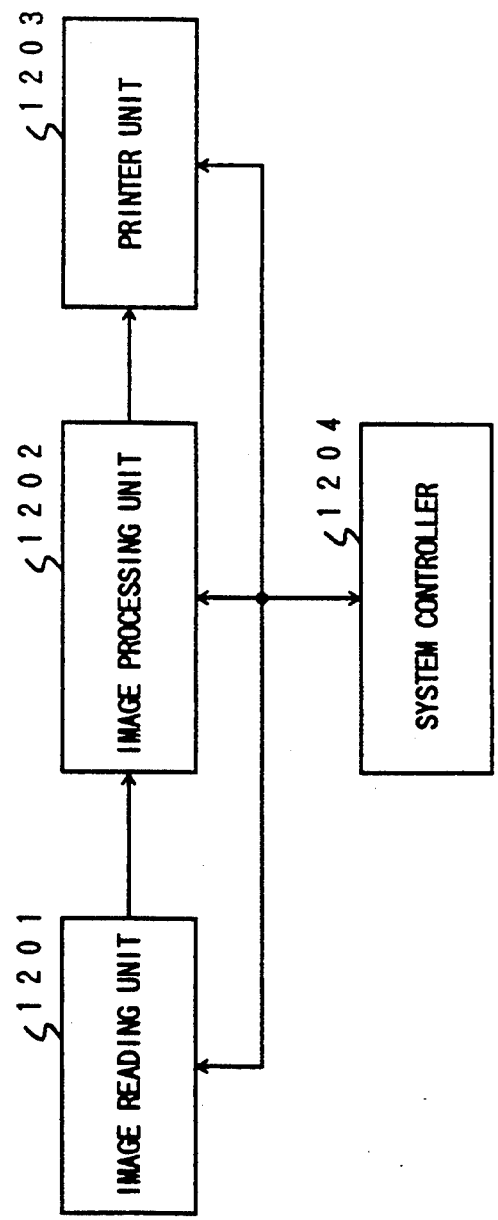
FIG. 33 is a block diagram illustrating another example of the control system of the copy machine.

In the tenth embodiment, the system is formed as shown in FIG. 33. Referring to FIG. 33, the system has a image reading unit 1201 for optically reading an original, an image processing unit 1202 for processing image data supplied from the image reading unit 1201, and a printer unit 1203 for printing a color image corresponding to printing image data supplied from the image processing unit 1202. The image processing unit 1202 performs, for example, a γ-correction process and a gray scale process.

Figure 34:
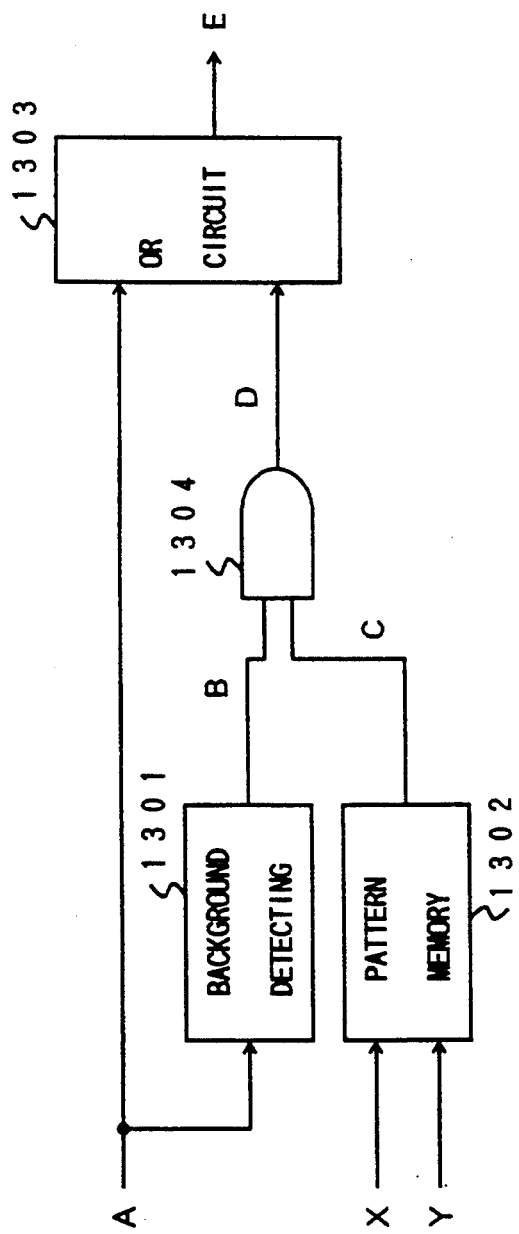
FIG. 34 is a block diagram illustrating a circuit for adding identification marks to an image.
Figure 35:
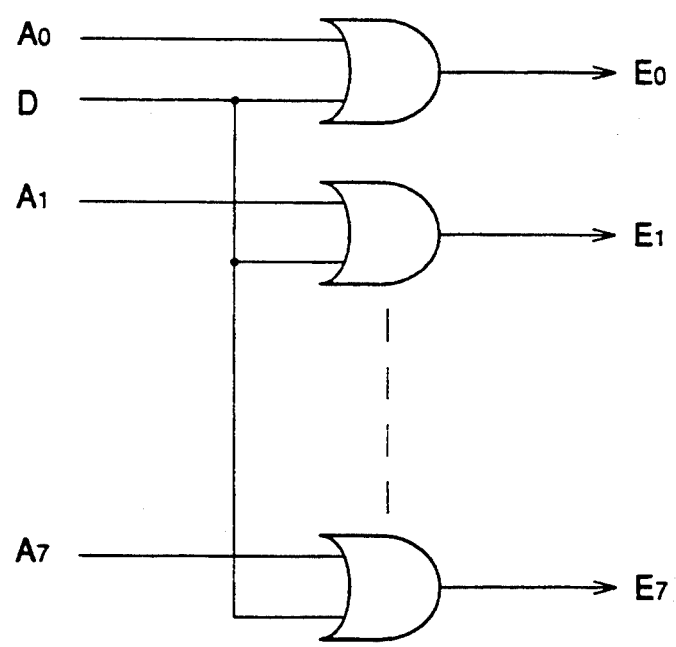
FIG. 35 is a circuit diagram illustrating an OR circuit shown in FIG. 34.

The image processing unit 1202 includes a circuit, as shown in FIG. 34, for adding identification marks to image data. Referring to FIG. 34, the circuit has a background detecting circuit 1301, a pattern memory 1302, an OR circuit 1303 and an AND gate 1304. Image data A having 8 bits (256 gray scale data) is supplies to the background detecting circuit 1301 and the OR circuit 1303. When each pixel in a block formed of 8×8 pixels has a gray scale level equal to or greater than a threshold level, the background detecting circuit 1301 determines that the block is a white block. If the number of white blocks successively arranged in the main scanning direction is equal to or greater than eight, the background detecting circuit 1301 activates a detecting signal B (B=1). The pattern memory 1302 stores identification information indicating a serial number of this copy machine. Identification image data C representing the identification information is read out from the pattern memory 1302 using an x address signal (corresponding to the main scanning direction) and a y address signal (corresponding to the sub scanning direction). The detecting signal B output from the background detecting circuit 1301 and the identification image data C are input to the AND gate 1304. The output signal D of the AND gate 1304 is supplied to the OR circuit 1303. Thus, only when the detecting signal B is active, the identification image data C is supplied to the OR circuit 1303. In the OR circuit 1303, the image data A and the signal D are added to each other so that image data E is output from the OR circuit 1303. The image data E having 8 bits (256 gray scale data) is supplied to the printer unit 1203. The OR circuit 1303 is formed as shown in FIG. 35. That is, the OR circuit 1303 has eight OR gates. The respective bits A0-A7 of the image data A are supplied to the OR gates, and the signal D is supplied to all the OR gates. Output signals of the OR gates are bits E0-E7 of the image data E output from the OR circuit 1303.

Figure 36:
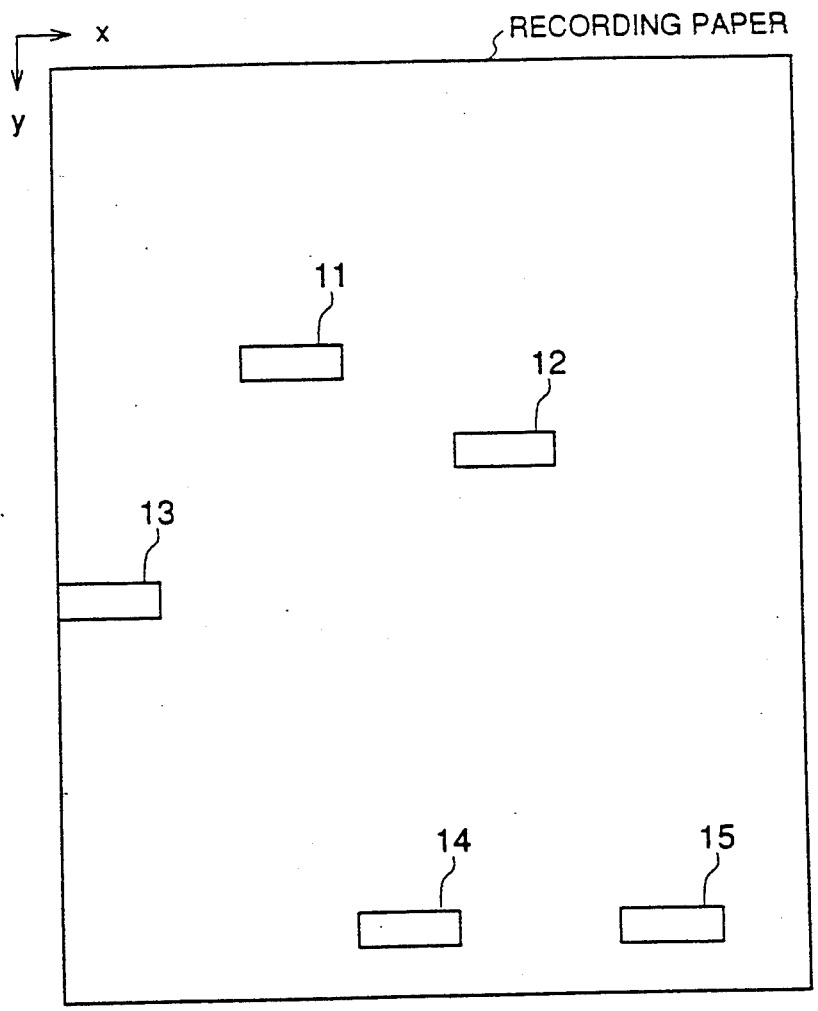
FIG. 36 is a diagram illustrating positions at which the identification marks are to be formed.
Figure 37A:
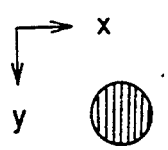
FIG. 37(A–E) is a diagram illustrating an element of an identification mark.
Figure 37B:
Figure 37C:
Figure 37D:
Figure 37E:

The identification mark is formed at positions 11, 12, 13, 14 and 15, as shown in FIG. 36, on a recording paper. The identification mark is formed of elements, for example, as shown in FIG. 37. Referring to FIG. 37. five dots are arranged in a line. The first dot A represents a leading end of the element. The remaining four dots B-E represents a number. The second dot B corresponds to the most significant bit (MSB) of the number, and the fifth dot E corresponds to the least significant bit (LSB). In FIG. 37, the third dot C and the fourth dot D are black, and the first dot B and the fifth dot E are white. Thus, the element shown in FIG. 37 represents a number "6". Each dot corresponds to one pixel, the dots A-E are arranged at intervals each of which has four pixels. The identification mark is formed of five elements arranged at intervals, each of which intervals has 16 pixels. The identification mark formed in the color image is read using a microscope.

A description will now be given, with reference to FIG. 38, of another embodiment of the present invention.

Figure 38:
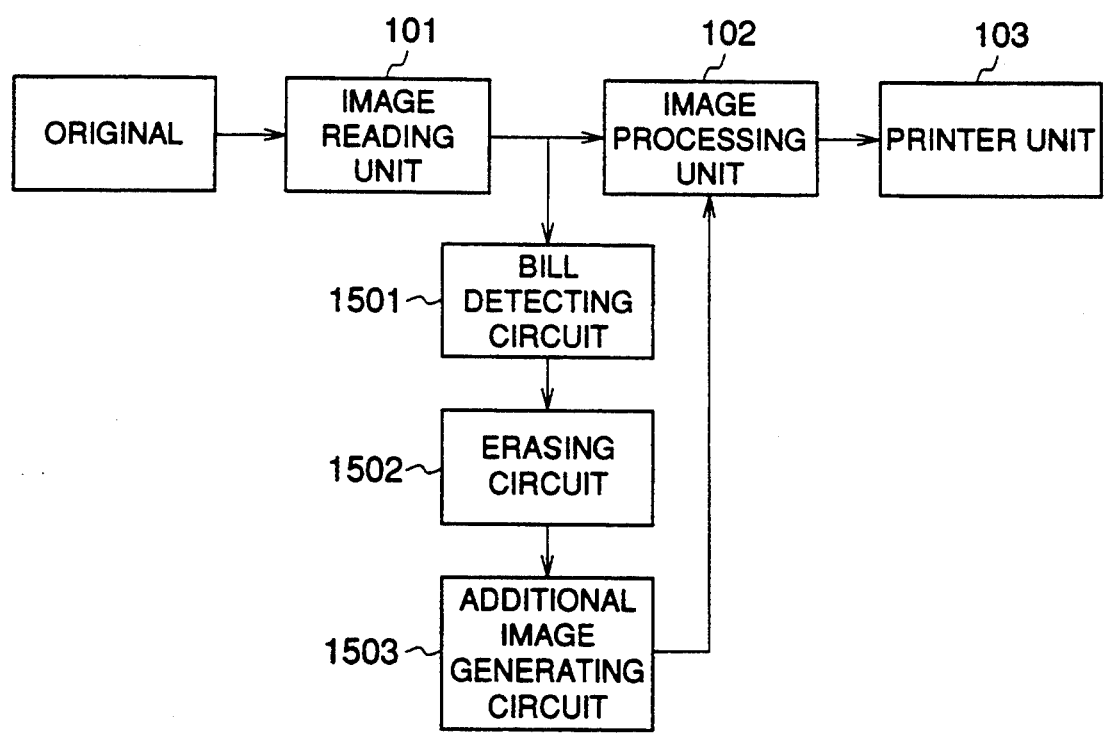
FIG. 38 is a block diagram illustrating another example of a control system of a copy machine.

In this embodiment, the system is formed as shown in FIG. 38. Referring to FIG. 38, the system has the image reading unit 101 for optically reading an original, an image processing unit 102 and a printer unit 103. The system also has a bill detecting circuit 1501, an erasing circuit 1502 and an additional image generating circuit 1503.

The bill detecting circuit 1501 determines, using a pattern matching process, whether of not image data supplied from the image reading unit 101 corresponds to a bill forgery of which is prohibited by law. When the bill detecting circuit 1501 determines that the image data corresponds to a bill, a detecting signal is supplies from the bill detecting circuit 1501 to the erasing circuit 1502. The erasing circuit 1502 erases the image data output from the image reading unit 101, The additional image generating circuit 1503 then outputs additional image data. The additional image data is supplied to the image processing unit 102. The image processing unit supplies the additional image data substituted for the image data to the printer unit 103. The printer unit 103 forms the additional image different from the image of the bill on a recording sheet.

It is preferable that the additional image indicate a message "It is prohibited to forge bills and securities by law".

The present invention is not limited to the aforementioned embodiments, and variations and modifications may be made without departing from the scope of the claimed invention.

POSSIBLE APPLICATION IN INDUSTRY

According to the present invention, since information idetifying the image forming apparatus is added to a recording paper when a color image is formed, even if bills and securities are forged by the image forming apparatus, a follow-up survey of the image forming apparatus can be performed based on the information.

What is claimed is:

1. An image forming apparatus comprising:
   image reading means for reading an original and for outputting image data corresponding to the original;
   image processing means, coupled to said image reading means, for processing the image data supplied from said image reading means in accordance with a predetermined method and for outputting printing image data;
   printing means, coupled to said image processing means, for printing an image, corresponding to the printing image data supplied from said image processing means, on a recording sheet;
   image adding means, coupled to printing means, for adding an identification information to the recording sheet on which the image is formed by said printing means, said identification information identifying said image forming apparatus;
   detecting means for detecting whether or not said image adding means has been removed from said image forming apparatus; and
   control means for prohibiting the image from being formed on the recording sheet when said detecting means detects that said image adding means has been removed from said image forming apparatus.

2. An image forming apparatus comprising:
   image reading means for reading an original and for outputting image data corresponding to the original;
   image processing means, coupled to said image reading means, for processing the image data supplied from said image reading means in accordance with a predetermined method and for outputting printing image data;
   printing means, coupled to said image processing means, for printing an image, corresponding to the printing image data supplied from said image processing means, on a recording sheet; and
   image adding means, coupled to printing means, for adding an identification information to the recording sheet on which the image is formed by said printing means, said identification information identifying said image forming apparatus,
   wherein said image adding means comprises,
   image composite means for adding said identification information to the printing image data, so that said printing means forms an image on the recording sheet in accordance with both the printing image data and said identification information, and
   dither processing means for processing the printing image data and the identification information in accordance with a dither method, a dither matrix pattern used to process the identification image being different from a dither matrix pattern used to process the printing image data so that the identification image information is distinguished from the printing image.

3. The image forming apparatus as claimed in claim 2, wherein said image adding means has a printing unit for printing the identification information on a rear side of the recording sheet using ink having a high transmittance in a visible region and a low transmittance in a region other than the visible region.

4. The image forming apparatus as claimed in claim 3, wherein said printing unit comprises a transfer roller for transferring an ink image indicating said identification information to the rear surface of the recording sheet.

5. The image forming apparatus as claimed in claim 3, wherein said printing unit comprises a stamping mechanism for stamping an ink image indicating said identification information on the rear surface of said recording sheet.

6. The image forming apparatus as claimed in claim 2, wherein said identification information includes a machine number of said image forming apparatus and a date on which the image is formed on the recording sheet.

7. The image forming apparatus as claimed in claim 2, wherein said image composite means has background detecting means for detecting a background of the image to be printed by said printing means, said image composite means adding the identification information to the printing image data such that an identification mark corresponding to said identification information is formed in the background of the image detected by said background detecting means.

8. The image forming apparatus as claimed in claim 2, wherein said image composite means has graphics area detecting means for detecting a graphics area of the image to be printed by said printing means, said image composite means adding the identification information to the printing image data such that an identification mark corresponding to said identification information is formed in a graphics area of the image detected by said graphics area detecting means.

9. The image forming apparatus as claimed in claim 2, said printing means has first means for forming a cyan image, second means for forming a magenta image, third means for forming a yellow image and fourth means for forming a black image said printing means superposing the cyan image, magenta image, a yellow image and black image so that a printed image is obtained, and wherein the identification information is supplied to said third means of said printing means so that an identification mark corresponding to said identification information is included in the yellow image.

* * * * *